(12) United States Patent
Rosen et al.

(10) Patent No.: US 11,398,141 B2
(45) Date of Patent: *Jul. 26, 2022

(54) HOSPITALITY LIGHT

(71) Applicant: Resilience Magnum IP, LLC, Cleveland, OH (US)

(72) Inventors: Steven Rosen, Hunting Valley, OH (US); Ronald Cozean, Madison, CT (US); Eric Allen, Long Beach, CA (US); David Edward Mordetzky, Oak Park, CA (US); Megan Horvath, Cleveland, OH (US); Anthony John Pyros, Cleveland, OH (US); John Elwood, Santa Ana, CA (US); Michael Chang, Long Beach, CA (US); Elie Attarian, Chatsworth, CA (US)

(73) Assignee: Resilience Magnum IP, LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/099,898

(22) Filed: Nov. 17, 2020

(65) Prior Publication Data
US 2021/0174650 A1 Jun. 10, 2021

Related U.S. Application Data

(63) Continuation of application No. 16/043,997, filed on Jul. 24, 2018, now Pat. No. 10,867,486.
(Continued)

(51) Int. Cl.
*G08B 25/14* (2006.01)
*G08B 5/36* (2006.01)
(Continued)

(52) U.S. Cl.
CPC ............ *G08B 5/36* (2013.01); *G06Q 10/02* (2013.01); *G06Q 50/12* (2013.01); *G08B 21/0446* (2013.01)

(58) Field of Classification Search
CPC ........ Y02B 20/40; Y02B 10/70; Y02B 20/30; Y02B 70/30; Y02B 90/20; H05B 47/19;
(Continued)

(56) References Cited

U.S. PATENT DOCUMENTS 6,147,624 A 11/2000 Clapper
6,236,303 B1 5/2001 Wagner et al.
(Continued)

FOREIGN PATENT DOCUMENTS

CN 105371177 A 3/2016
CN 105959380 A 9/2016

OTHER PUBLICATIONS

Final Office Action received for U.S. Appl. No. 16/044,027 dated Oct. 8, 2020, 29 pages.
(Continued)

*Primary Examiner* — Daniel Previl
(74) *Attorney, Agent, or Firm* — Amin, Turocy & Watson, LLP

(57) ABSTRACT

Techniques for hospitality light are provided. A hospitality light can determine characteristics of the environment in which the hospitality light is installed, determine capabilities of hospitality light, determine one or more objectives of the installation of hospitality light related to providing a hospitality service to a guest in the environment, perform a self-configuration of hospitality light according to the determined one or more objectives, and determine and execute suitable actions for hospitality light to perform to achieve the determined one or more objectives.

20 Claims, 23 Drawing Sheets

Related U.S. Application Data

(60) Provisional application No. 62/632,751, filed on Feb. 20, 2018, provisional application No. 62/568,294, filed on Oct. 4, 2017.

(51) Int. Cl.
  *G06Q 50/12* (2012.01)
  *G06Q 10/02* (2012.01)
  *G08B 21/04* (2006.01)

(58) Field of Classification Search
  CPC ...... H05B 47/195; H05B 45/10; H05B 47/16; H05B 45/3725; H05B 45/375; H05B 47/11; H05B 45/20; H05B 47/115; H05B 45/38; H05B 47/105; H05B 45/00; H05B 47/125; H05B 45/325; H05B 45/395; H05B 45/37; H05B 45/385; H05B 45/357; H05B 45/22; H05B 45/12; H05B 47/24; H05B 47/28; H05B 47/13; H05B 45/56; H05B 47/175; H02J 9/02; H02J 9/065; H02J 7/34; H02J 7/0068; H02J 7/345; H02J 9/061; H02J 13/00006; H02J 13/00017; H02J 50/00; H02J 50/001; H02J 50/10; H02J 50/20; H02J 50/40; H02J 7/0029; H02J 7/00306; H02J 7/00308; H02J 7/0042; H02J 7/025; H02J 3/00; F21Y 2115/10; F21Y 2115/15; F21Y 2101/00; F21S 9/022; F21S 2/00; F21S 8/033; F21S 8/04; F21S 9/037; F21V 23/0442; F21V 23/0471; F21V 17/02; F21V 21/0824; F21V 21/30; F21V 23/04; F21V 23/0407; F21V 23/0421; F21V 23/0435; F21V 23/0464; F21V 23/003; F21V 3/00; A47L 11/405; A47L 23/02; A61L 2202/14; A61L 2202/15; A61L 2/0047; A61L 2/10; A61L 2/24; A61L 9/015; E04F 15/02405; E04F 2011/1048; F21W 2111/027; F21W 2131/3005; F21K 9/23; F21K 9/238; F21K 9/233; F21K 9/232; F21K 9/27; Y10S 362/806; Y10S 315/04; Y04S 20/20; Y04S 20/221; Y04S 20/246; Y04S 40/12; Y04S 40/124; H04L 67/10; H04L 1/0007; H04L 7/0004; H04L 51/20; H04L 51/28; H04L 63/107; H04L 67/1097; H04L 67/2842; H04L 67/32; H04B 10/116; H04B 10/541; H02H 3/08; H02H 3/20; A01K 5/0291; A01K 79/02; A61B 1/00034; A61B 1/00055; A61B 1/0676; A61B 1/0684; A61B 1/267; A61B 2562/0247; A61B 2562/043; B65B 69/00; F21L 4/005; F21L 4/027; F21L 4/085; H01Q 1/248; H01Q 1/44; B60Q 1/24; B60Q 1/323; B60Q 1/50; F25D 2700/12; F25D 29/008; G01K 5/08; G01K 5/16; G01R 22/00; G06Q 30/02
  USPC .. 340/286.01, 539.1, 540, 286.08, 332, 541, 340/815.47, 815.45, 300, 330
  See application file for complete search history.

(56) References Cited

U.S. PATENT DOCUMENTS

| | | | |
|---|---|---|---|
| 6,528,954 B1 | 3/2003 | Lys | |
| 6,946,974 B1 | 9/2005 | Racunas Jr. | |
| 7,026,954 B2 | 4/2006 | Slemmer et al. | |
| 7,111,952 B2 | 9/2006 | Veskovic | |
| 7,824,065 B2* | 11/2010 | Maxik | F21K 9/233 362/234 |
| 8,280,558 B2 | 10/2012 | Picco | |
| 8,283,812 B2 | 10/2012 | Azancot et al. | |
| 8,362,713 B2 | 1/2013 | Recker et al. | |
| 8,545,033 B2* | 10/2013 | Gielen | F21V 29/86 362/84 |
| 8,600,786 B2 | 12/2013 | Stefik et al. | |
| 8,674,616 B2 | 3/2014 | Holman et al. | |
| 8,950,461 B2 | 2/2015 | Adams et al. | |
| 9,367,050 B2 | 6/2016 | Jain et al. | |
| 9,560,388 B2 | 1/2017 | Ogle et al. | |
| 9,594,956 B2 | 3/2017 | Cohen et al. | |
| 9,595,193 B1 | 3/2017 | Duale et al. | |
| 9,601,018 B2 | 3/2017 | Cogill et al. | |
| 9,644,799 B2 | 5/2017 | Crayford et al. | |
| 9,700,641 B2 | 7/2017 | Hawkins et al. | |
| 9,893,551 B2 | 2/2018 | Cheatham, III et al. | |
| 9,938,765 B2 | 4/2018 | Berman et al. | |
| 10,210,355 B1 | 2/2019 | Lai | |
| 10,251,242 B1 | 4/2019 | Rosen et al. | |
| 10,574,757 B2 | 2/2020 | Rosen et al. | |
| 10,677,402 B2 | 6/2020 | Rosen et al. | |
| 10,867,486 B2* | 12/2020 | Rosen | G08B 5/36 |
| 2002/0171562 A1 | 11/2002 | Muraki | |
| 2004/0022058 A1 | 2/2004 | Birrell | |
| 2005/0128751 A1 | 6/2005 | Roberge et al. | |
| 2005/0248299 A1 | 11/2005 | Chemel et al. | |
| 2006/0044798 A1* | 3/2006 | Pazula | H01R 33/94 362/253 |
| 2006/0197684 A1 | 9/2006 | Tremblay | |
| 2008/0191009 A1 | 8/2008 | Gressel et al. | |
| 2009/0059603 A1 | 3/2009 | Recker et al. | |
| 2009/0303079 A1 | 12/2009 | Khim | |
| 2010/0007525 A1 | 1/2010 | Shanbhag et al. | |
| 2010/0060485 A1 | 3/2010 | Kim | |
| 2010/0309024 A1 | 12/2010 | Mimeault | |
| 2011/0006893 A1* | 1/2011 | Finch | E05D 11/0081 340/539.1 |
| 2011/0193872 A1 | 8/2011 | Biemath et al. | |
| 2012/0011033 A1 | 1/2012 | Salgia | |
| 2012/0066144 A1 | 3/2012 | Berkvens et al. | |
| 2012/0092192 A1 | 4/2012 | Wong | |
| 2012/0098655 A1* | 4/2012 | Preta | H05B 47/19 340/438 |
| 2013/0002587 A1 | 1/2013 | Biggs et al. | |
| 2013/0073350 A1 | 3/2013 | Blustein | |
| 2013/0113936 A1 | 5/2013 | Cohen et al. | |
| 2013/0300911 A1 | 11/2013 | Beckman | |
| 2014/0049963 A1 | 2/2014 | McGuire | |
| 2014/0049972 A1 | 2/2014 | McGuire | |
| 2014/0055990 A1 | 2/2014 | Reed | |
| 2014/0217914 A1 | 8/2014 | Maxik | |
| 2014/0262057 A1 | 9/2014 | Chambers et al. | |
| 2015/0195100 A1 | 7/2015 | Imes et al. | |
| 2015/0286938 A1 | 10/2015 | Blair et al. | |
| 2016/0047164 A1 | 2/2016 | Lundy et al. | |
| 2016/0085884 A1 | 3/2016 | Schafer et al. | |
| 2016/0135271 A1 | 3/2016 | Alexander | |
| 2016/0104325 A1 | 4/2016 | Lu | |
| 2016/0216443 A1 | 7/2016 | Morgan et al. | |
| 2016/0359325 A1 | 12/2016 | Kawata et al. | |
| 2017/0073074 A1 | 3/2017 | Gagnon et al. | |
| 2017/0094756 A1 | 3/2017 | Saffari | |
| 2017/0192406 A1 | 7/2017 | Ashdown et al. | |
| 2017/0247289 A1 | 8/2017 | Waldschmidt et al. | |
| 2017/0322350 A1 | 11/2017 | Montagne | |
| 2018/0096634 A1* | 4/2018 | Walker | F21V 23/0471 |
| 2018/0154032 A1* | 6/2018 | Dombrowsky | A61L 2/0047 |
| 2018/0156429 A1 | 6/2018 | Carlet et al. | |
| 2018/0163934 A1* | 6/2018 | Miller | F21L 4/027 |
| 2018/0167516 A1* | 6/2018 | Warrick | G05B 19/042 |
| 2018/0211503 A1 | 7/2018 | Baliga et al. | |
| 2018/0216791 A1 | 8/2018 | Leung et al. | |
| 2018/0224596 A1 | 8/2018 | Creasman et al. | |
| 2018/0259141 A1 | 9/2018 | Yamaguchi et al. | |

(56) References Cited

U.S. PATENT DOCUMENTS

2018/0313660 A1 11/2018 Eyster et al.
2019/0069379 A1 2/2019 Kastee et al.
2019/0104181 A1 4/2019 Rosen et al.

OTHER PUBLICATIONS

Final Office Action received for U.S. Appl. No. 16/043,875 dated Jan. 25, 2020, 13 pages.
Non-Final Office Action received for U.S. Appl. No. 16/044,047 dated Dec. 26, 2018, 22 pages.
Notice of Allowance received for U.S. Appl. No. 16/044,073 dated Nov. 8, 2018, 20 pages.
Non-Final Office Action received for U.S. Appl. No. 16/043,974 dated May 2, 2019, 28 pages.
Non-Final Office Action received for U.S. Appl. No. 16/043,798 dated Jun. 27, 2019, 15 pages.
Non-Final Office Action received for U.S. Appl. No. 16/130,720 dated Jul. 25, 2019, 37 pages.
Non-Final Office Action received for U.S. Appl. No. 16/270,646 dated Aug. 21, 2019, 29 pages.
Non-Final Office Action received for U.S. Appl. No. 16/739,627 dated Feb. 7, 2020, 19 pages.
Non-Final Office Action received for U.S. Appl. No. 16/544,023 dated Apr. 9, 2020, 28 pages.
Non-Final Office Action received for U.S. Appl. No. 16/043,997 dated Apr. 8, 2020, 46 pages.
Non-Final Office Action received for U.S. Appl. No. 16/821,007 dated May 1, 2020, 36 pages.
Non-Final Office Action received for U.S. Appl. No. 16/044,027 dated Jun. 22, 2020, 48 pages.
Notice of Allowance received for U.S. Appl. No. 16/043,949 dated May 21, 2020, 49 pages.
Non-Final Office Action received for U.S. Appl. No. 16/043,875 dated May 27, 2020, 15 pages.
Non-Final Office Action received for U.S. Appl. No. 16/043,875 dated Jul. 8, 2020, 36 pages.
Notice of Allowance received for U.S. Appl. No. 16/043,997 dated Aug. 7, 2020, 46 pages.
U.S. Appl. No. 16/043,997, filed Jul. 24, 2018.
Non-Final Office Action received for U.S. Appl. No. 16/856,434 dated Sep. 1, 2020, 50 pages.
Final Office Action received for U.S. Appl. No. 16/682,085 dated Oct. 28, 2020, 27 pages.
Final Office Action received for U.S. Appl. No. 16/682,085 dated Oct. 8, 2020, 29 pages.
Non-Final Office Action received for U.S. Appl. No. 16/739,627 dated Apr. 26, 2021, 31 pages.
Non-Final Office Action received for U.S. Appl. No. 16/043,875 dated May 26, 2021, 45 pages.
Non-Final Office Action received for U.S. Appl. No. 16/044,027 dated Jun. 9, 2021, 29 pages.
Non-Final Office Action received for U.S. Appl. No. 17/062,929 dated May 5, 2021, 38 pages.
Final Office Action received for U.S. Appl. No. 16/739,627 dated Sep. 30, 2021, 33 pages.
Non-Final Office Action received for U.S. Appl. No. 17/099,928 dated Jun. 24, 2021, 53 pages.
Notice of Allowance received for U.S. Appl. No. 17/005,534 dated Aug. 4, 2021, 50 pages.
Notice of Allowance received for U.S. Appl. No. 17/062,929 dated Aug. 9, 2021, 27 pages.
Non-Final Office Action received for U.S. Appl. No. 17/036,417 dated Mar. 30, 2022, 61 pages.

* cited by examiner

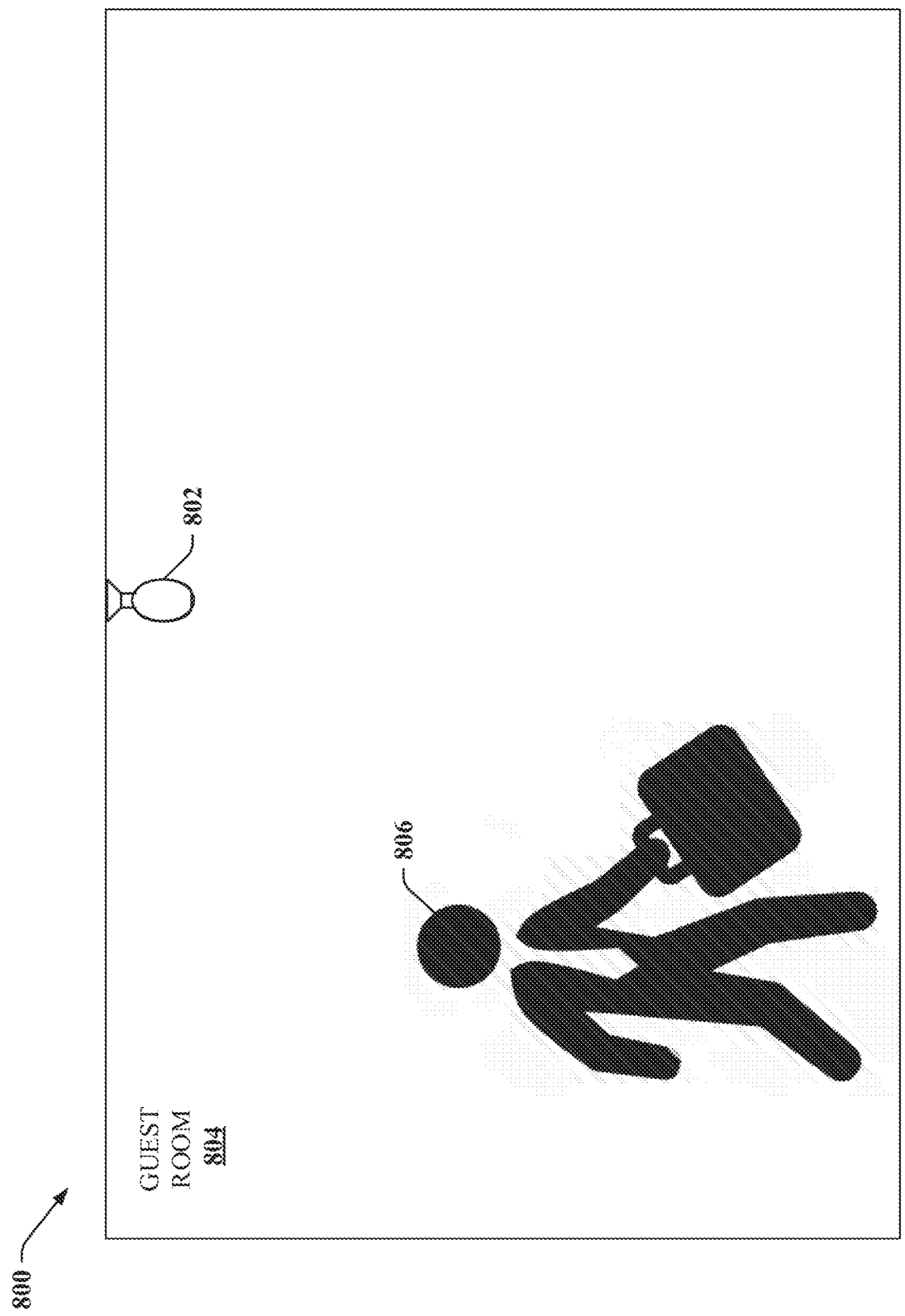

HOSPITALITY LIGHT

CROSS-REFERENCE TO RELATED APPLICATIONS

This application is a continuation of, and claims priority to each of, pending U.S. patent application Ser. No. 16/043,997, filed on Jul. 24, 2018, entitled "USER HOSPITALITY LIGHT", which claims the benefit of U.S. Provisional patent Application Ser. No. 62/632,751 filed on Feb. 20, 2018, entitled "HOSPITALITY LIGHT", and claims the benefit of U.S. Provisional patent Application Ser. No. 62/568,294 filed on Oct. 4, 2017, entitled "SELF AWARE LIGHTS THAT SELF-CONFIGURE." The entireties of the aforementioned applications are incorporated by reference herein.

BACKGROUND

The subject disclosure relates generally to lights that perform hospitality functions.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate a hospitality light performing actions to provide hospitality services in an environment are described.

According to an embodiment, a hospitality light bulb is provided. The hospitality light bulb comprises one or more instruments, a memory that stores computer executable components, and a processor that executes the computer executable components stored in the memory. The computer executable components can comprise: an operation component that: employs at least one instrument of the one or more instruments to monitor a guest in an environment in which hospitality light is installed; in response to a determination of one or more characteristics associated with the guest in the environment, determine, by the hospitality light, one or more actions to perform to achieve one or more objectives of the installation of the hospitality light related to providing a hospitality service to the guest in the environment based on the one or more characteristics; and executes the at least one action.

In another embodiment, a hospitality light is provided. The hospitality light comprises a hospitality light fixture, a hospitality light bulb configured for installation in the hospitality light fixture, one or more instruments located in at least one of the hospitality light bulb or the hospitality light fixture, a memory that stores computer executable components, and a processor that executes the computer executable components stored in the memory. The computer executable components can comprise: an operation component that: employs at least one instrument of the one or more instruments to monitor a guest in an environment in which the hospitality light is installed; in response to a determination of one or more characteristics associated with the guest in the environment, determine, by the hospitality light, one or more actions to perform to achieve one or more objectives of the installation of the hospitality light related to providing a hospitality service to the guest in the environment based on the one or more characteristics; and executes the at least one action.

In another embodiment, a method comprises: determining, by a hospitality light bulb via one or more instruments of the hospitality light bulb, one or more characteristics of an environment in which hospitality light bulb is installed; determining, by the hospitality light bulb, one or more capabilities of the hospitality light bulb; generating, by the hospitality light bulb, one or more objectives for the hospitality light bulb related to providing a hospitality service to a guest in the environment based on the one or more characteristics and the one or more capabilities; and configuring, by the hospitality light bulb, at least one setting of at least one parameter of the hospitality light bulb to achieve the one or more objectives.

DESCRIPTION OF THE DRAWINGS

FIG. 8 illustrates a block diagram of an example, non-limiting environment in which a hospitality light is installed in accordance with one or more embodiments described herein.

DETAILED DESCRIPTION

Figure 1:
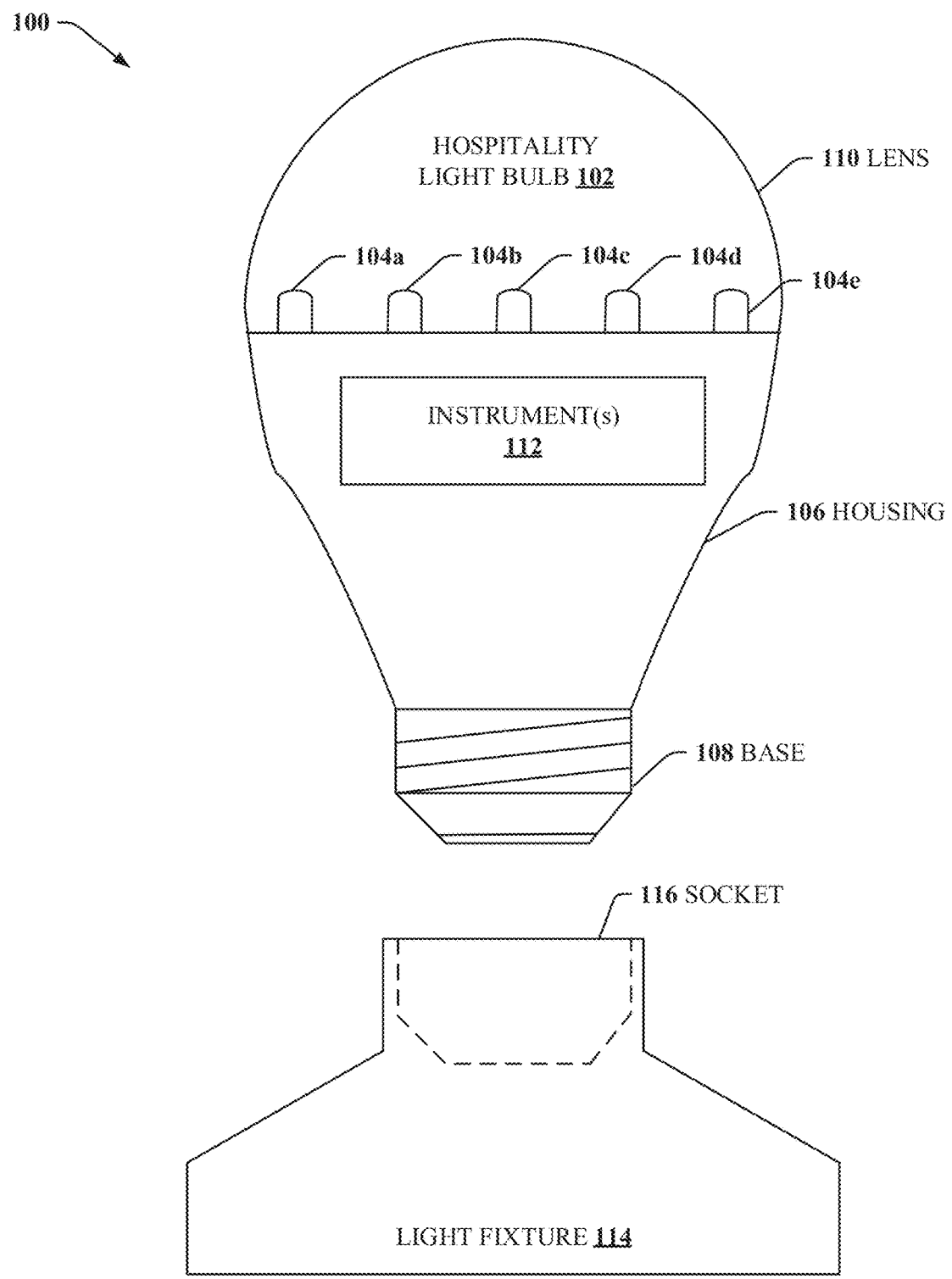
FIG. 1 illustrates a block diagram of an example, non-limiting hospitality light in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however in various cases, that the one or more embodiments can be practiced without these specific details.

Hotel guests often need directions regarding navigating the hotel. Instructions are typically provided by hotel staff through verbal instructions, which can be confusing to the guest(s), as well as take up valuable staff time. Also, guests require other hotel services (e.g. concierge, housekeeping, check-in, check-out, transportation arrangements, reservations for restaurants, instruction on how to perform a task or operate a device, and/or activities, and any other suitable hotel services) that can require interaction with hotel staff, taking up staff time, as well as causing waiting time for the guest to receive service.

There is a need to provide hospitality lights in various environments that can automatically identify guest needs in the environments and execute actions to satisfy the needs. An environment can be an indoor environment, and outdoor environment, or any other suitable environment in which a light can be installed. While examples herein describe a hotel environment for exemplary purposes, it is to be appreciated that the environment in which a hospitality light can be installed can include any environment in which a guest can need hospitality services, non-limiting examples of which can include, a shopping environment (e.g., a store, a mall, a fair, a trade show, a vehicle dealership, a food court, etc.), an office complex, a library, a government building, an airport, a train station, a bus terminal, a campus, a school, a park, camping grounds, an amusement park, a zoo, a hospital, a warehouse, a factory, or any other suitable environment in which a guest can need hospitality services.

In accordance with various disclosed aspects, a hospitality light that comprises instruments, and is able to communicate with other hospitality lights and other devices is presented. The hospitality light can understand its environment and device ecosystem using the instruments, and perform a self-configuration to optimize its functionality to perform hospitality services in the environment. In an example, the hospitality light can employ artificial intelligence capabilities and instruments to monitor characteristics and guests of the environment in which the hospitality light is installed, and optimize function to provide hospitality services for the guests in the environment. For example, the hospitality light can employ facial recognition to detect a hotel guest, greet the guest with audio and/or visual indications, provide suggestions, directions, promotions, etc. A set of hospitality lights can operate in a coordinated manner to direct the guest to their room. By providing directions, hospitality lights can speed up the check-in process by avoiding check-in staff spending time on this function, which can be annoying to other guests waiting in a check-in line.

In another example, a hospitality light can suggest activities for the guest based on pattern recognition, such as gear/clothing that the guest is carrying or wearing. In an additional example, hospitality light can offer promotions to the guest for hotel services or neighboring businesses. Additionally, the hospitality light can provide concierge services, such as making dinner/activity reservations. In another example, a hospitality light can adjust lighting output according to a guest's preference (e.g. guest defined or system learned).

In a further example, a hospitality light can be in the form of LED carpeting that displays pathway directions, advertising logos, promotions, etc.

Moreover, a hospitality light can monitor an area for certain conditions and enhance hotel service operations. For example, one or more hospitality lights in a guest room can determine that no guests are in the room and inform housekeeping to clean the room. In a further example, a hospitality light in a hallway can determine that a clean room door handle hanger is hanging on the door handle of a room and inform housekeeping to clean the room. In another example, a hospitality light in a hallway can determine that a laundry bag is hanging on the door handle of a room and inform laundry services to pickup the laundry bag. In an additional example, a hospitality light in a hallway can determine that a meal service tray is sitting on the floor outside of a room and inform the kitchen to pickup the meal service tray. In a further example, a hospitality light in a guest rooms can determine the state of the guest room (e.g. estimate of how much work is required to clean it) and inform housekeeping or in a coordinated manner schedule housekeeping in an optimal manner to clean the guest room.

In an example, the hospitality light can learn over time patterns of guest activity and other conditions of an environment and adjust operations accordingly. The hospitality light can adjust its lights, employ instruments, or instruct other devices/systems on operations to enhance hospitality services to guests in the environment while minimizing negative impacts on the guests.

It is to be appreciated that the hospitality light can be a retrofit light bulb with instruments integrated therein. In another embodiment, the hospitality light can have all or a portion of the instruments integrated into a light fixture (e.g. socket, holder, ballast) for the hospitality light. A hospitality light can learn about its context and customize its configuration and/or operation in accordance with the context (e.g. using artificial intelligence). This can eliminate or minimize the need for an operator (e.g. user, administrator, or any other suitable entity) to perform manual configuration. Furthermore, a set of hospitality lights can automatically perform coordinated self-configuration and operation. All examples below can involve coordination amongst a set of hospitality lights to achieve an objective (e.g. goal, intention, purpose, action, operation, configuration, etc.), whether explicitly stated or not. Further, although the term "hospitality light" is used herein, in various embodiments, the examples provided can include one or more hospitality lights operating independently or in a distributed fashion, as applicable. All such embodiments are envisaged.

Figure 2:
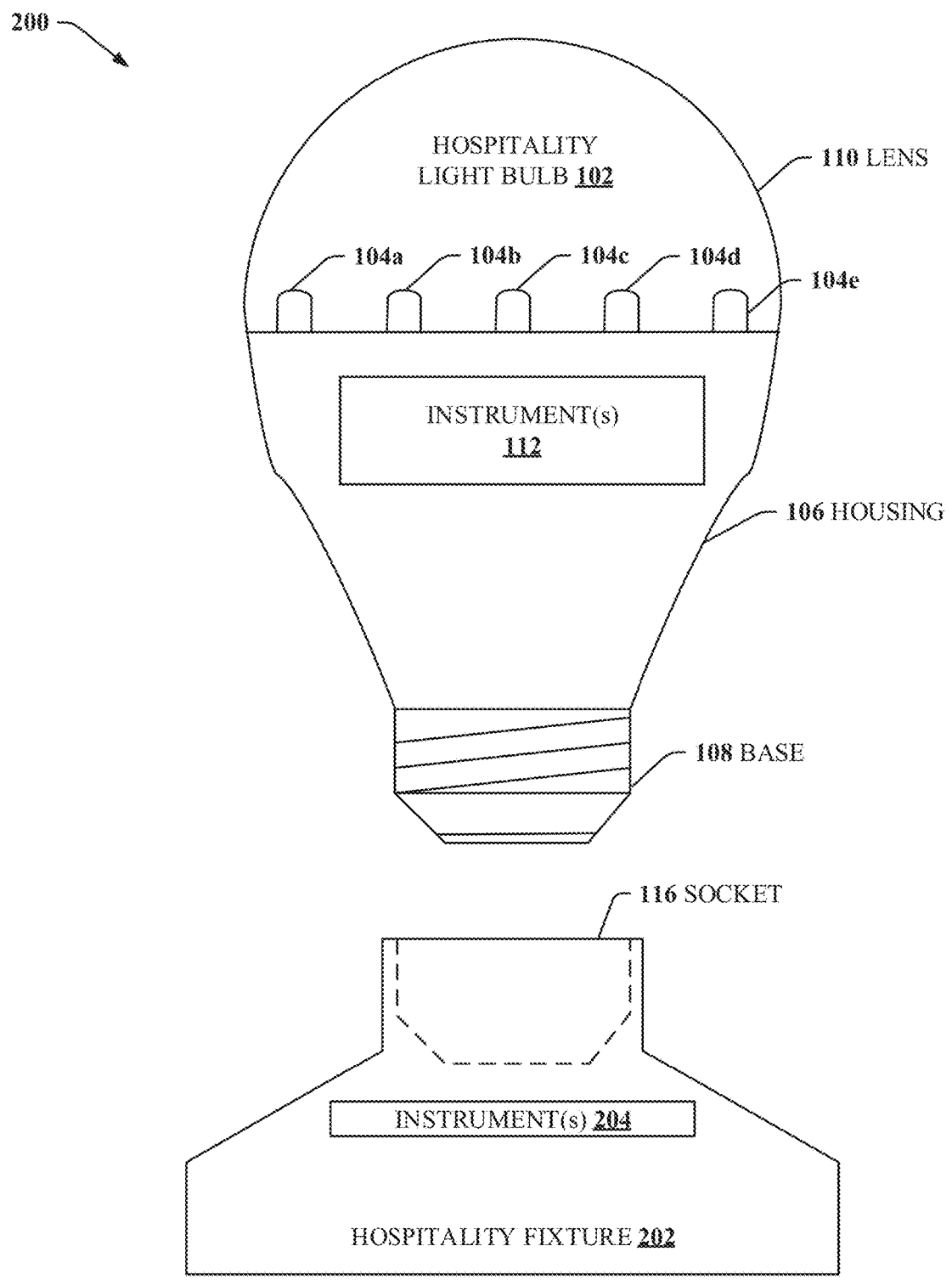
FIG. 2 illustrates a block diagram of an example, non-limiting hospitality light in accordance with one or more embodiments described herein.

FIGS. 1-2 illustrate block diagrams of example, non-limiting hospitality lights 100, 200 in accordance with one or more embodiments described herein. The subject disclosure is directed to computer processing systems, computer-implemented methods, apparatus and/or computer program products that facilitate efficiently, effectively, and automatically (e.g., with little or no direct involvement from an operator) employing hospitality lights 100, 200 that perform self-configuration to identify characteristics in an environment and utilize one or more instruments to perform one or more actions to provide hospitality services to guests in the environment. For example, when installed, hospitality light 100, 200 can employ sensors, tools, and communication devices to determine its place in the environment and device ecosystem and perform an auto-configuration to perform hospitality service functions in the environment. In an example, hospitality light 100, 200 can employ sensors to understand the physical environment in which it is installed, and determine how it fits into the physical environment. In another example, hospitality light 100, 200 can communicate on one or more networks to identify other hospitality lights 100, 200 and other devices in the device ecosystem, and determine how it fits into the device ecosystem. Based on the determinations, hospitality light 100, 200 can perform an autoconfiguration to perform hospitality service functions in the environment. It is to be appreciated that a user interface (not shown) can be provided that allows an operator to manually adjust the configuration generated by the hospitality light 100, 200.

In order to facilitate self-configuration, hospitality lights 100, 200 described herein can be employed that are communicating with each other, communicating with another device. The hospitality lights 100, 200 can coordinate amongst themselves to make decisions regarding actions to be taken by the hospitality lights 100, 200. Hospitality lights 100, 200 can receive instructions from another device, such as a control system, regarding actions to be taken by the hospitality lights 100, 200. Hospitality lights 100, 200 can receive instructions from an operator, regarding actions to be taken by the hospitality lights 100, 200. A hospitality light 100, 200 can autonomously make decisions regarding actions to be taken by the hospitality light 100, 200. It is to be appreciated that hospitality lights can employ any of the aforementioned decision-making methods, alone or in combination, regarding actions to be taken by the hospitality lights 100, 200.

FIG. 1 illustrates a block diagram of an example, non-limiting hospitality light 100 in accordance with one or more embodiments described herein. Hospitality light 100 comprises a hospitality light bulb 102 which can be installed into a retrofit into a socket 116 of conventional light fixture 114. Hospitality light bulb 102 comprises one or more light emitting devices 104a, 104b, 104c, 104d, and 104e (e.g. light emitting diode (LED), organic light emitting diode (OLED), filament, quantum dot, incandescent, high-intensity discharge (HID), neon, fluorescent, compact fluorescent (CFL), electroluminescent (EL), laser, or any other suitable light emitting device) a housing 106, a base 108, a lens 110, and one or more instruments 112. It is to be appreciated that while five light emitting devices 104a, 104b, 104c, 104d, and 104e are depicted for illustrative purposes only, hospitality light bulb 102 can include any suitable number of light emitting devices. It is also to be appreciated that hospitality light bulb 102 can include other components (not shown) or exclude one or more components. For example, hospitality light bulb 102 can exclude lens 110. In another example, hospitality light bulb 102 can include one or more reflectors, one or more shades, one or more positioning motors, or any other suitable components needed according to functionality described herein.

FIG. 2 illustrates a block diagram of an example, non-limiting hospitality light 200 in accordance with one or more embodiments described herein. Hospitality light 100 comprises a hospitality light bulb 102 which can be installed into a socket 116 of a hospitality light fixture 202. Hospitality light fixture 202 comprises one or more instruments 204. It is to be appreciated that hospitality light fixture 202 can include other components (not shown) or exclude one or more components. For example, hospitality light fixture 202 can include one or more light emitting devices, one or more reflectors, one or more shades, one or more positioning motors, or any other suitable components needed according to functionality described herein. It is to be appreciated that hospitality light bulb 102 can communicate with hospitality light fixture 202 via wired or wireless communications. For example, base 108 connecting to socket 116 can form a wired communication connection.

While FIGS. 1-2 depict a hospitality light bulb 102 fitting into a light fixture 114, 202, it is to be appreciated that a single light fixture 114, 202 can comprise a plurality of sockets 116 for installation of a plurality of hospitality light bulbs 102.

Figure 3:
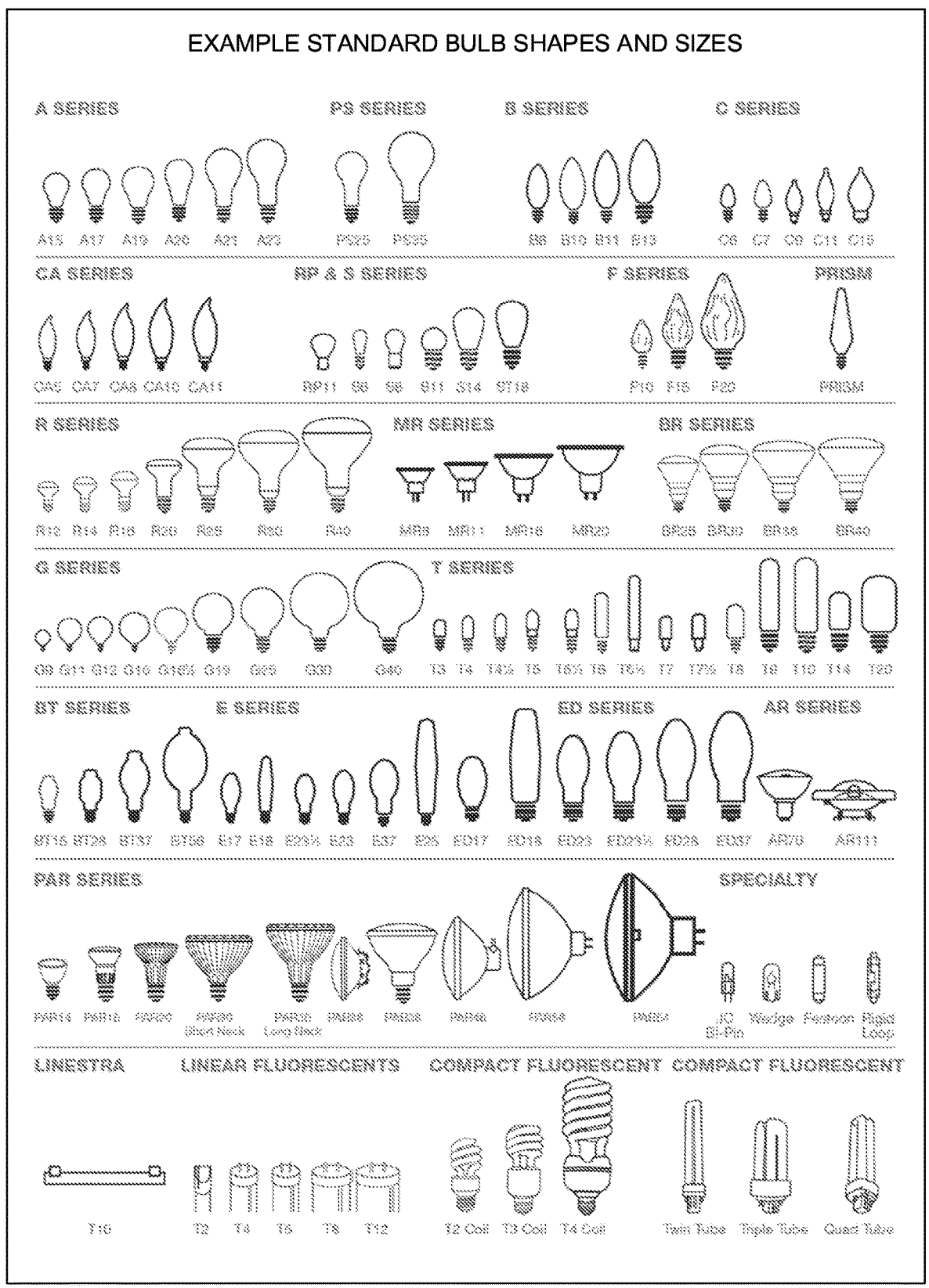
FIG. 3 illustrates example, non-limiting standard bulb shapes and size for hospitality light bulb in accordance with one or more embodiments described herein.

FIG. 3 illustrates example, non-limiting standard bulb shapes and size for hospitality light bulb 102. It is to be appreciated that hospitality light bulb 102 can be customized to be in any suitable shape and any suitable size for an application in which hospitality light bulb 102 is to be installed.

Figure 4:
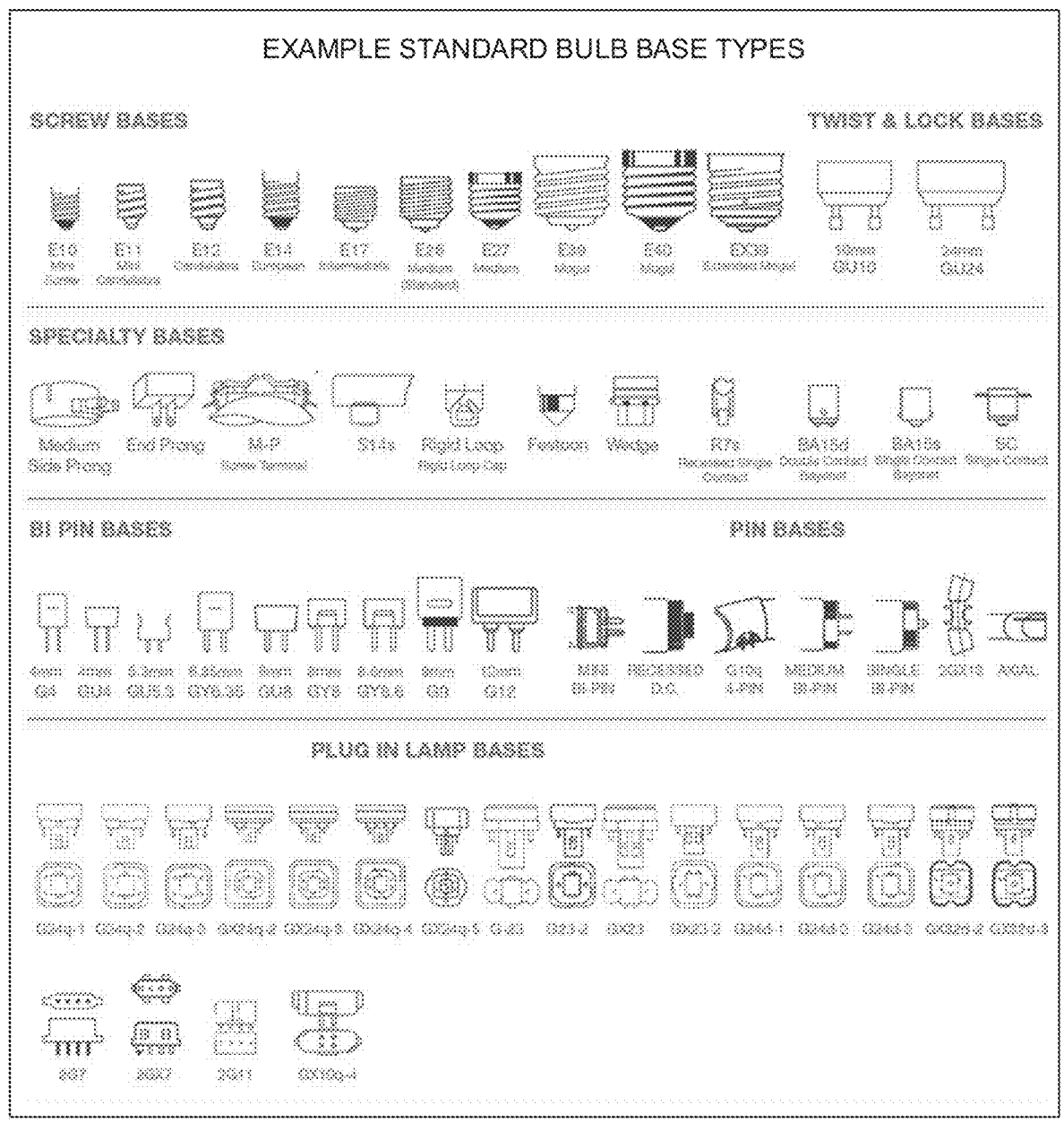
FIG. 4 illustrates example, non-limiting standard base types for base of hospitality light bulb in accordance with one or more embodiments described herein.

FIG. 4 illustrates example, non-limiting standard base types for base 108. It is to be appreciated that base 108 can be customized to be in any suitable form for an application in which hospitality light bulb 102 is to be installed. Likewise, socket 116 can be customized to be compatible with base 108. Additionally, hospitality light fixture 202 can be customized to be in any suitable form for an application in which hospitality light 200 is to be installed.

A hospitality light 100, 200 can include a power source, non-limiting examples of which include electrical grid power, battery, electrochemical cell, fuel cell, natural gas generated electric power, compressed air generated electric power, diesel fuel generated electric power, gasoline generated electric power, oil generated electric power, propane generated electric power, nuclear power system, solar power system, wind power system, piezoelectric power system, micro-electrical mechanical systems (MEMS)-generated electric power, inductive power system, radio-frequency power system, wireless power transfer mechanism, or any other suitable power source. In an example, a hospitality light 100, 200 can have a constantly available power source, such as that provided by an electrical power grid. In another example, a hospitality light 100, 200 can have a temporary power source, such as a battery (e.g. disposable battery or rechargeable battery). In a further example, a hospitality light 100, 200 can generate and store its own power, such as by solar, fuel cell, radio-frequency harvesting, induction, piezoelectric, electro-mechanical, chemical, nuclear, carbon based-fuel, or any other suitable self-generating power source. This is advantageous for long-term installations (e.g. where frequent battery changes would be required) that do not have a constantly available power source, such as an outdoor environment where a power outlet is not available (e.g. a porch, a yard, a camping site, a farm field, a park, a sports field, etc.), or an indoor location where a power outlet is not available (e.g. a closet, a sunroom, a cabinet, a drawer, a garage, a barn, a shed, an indoor location where an extension cord is not desired, etc.). It is to be appreciated that hospitality light 100, 200 can have a plurality of different power sources, with one or more power sources acting as a backup for another power source. It is to be appreciated that hospitality light 100, 200 can have configurable power sources. For example, hospitality light 100, 200 can have a modular configuration that allows for one or more power sources to be added or removed by a manufacturer or operator.

A hospitality light 100, 200 can include one or more computers, one or more processors, one or more memories, and one or more programs. A hospitality light 100, 200 can communicate via any suitable form of wireless or wired communication using a communication device. Non-limiting examples of wireless communication can include radio communication, optical communication, sonic communication, electromagnetic induction communication, or any other suitable wireless communication. A hospitality light 100, 200 can include one or more instruments 112, 204, non-limiting examples of which include a communication device, a radio frequency identification (RFID) reader, a navigation device, a camera, a video camera, a three-dimensional camera, a global positioning system (GPS) device, a motion sensor, a radar device, a temperature sensor, a weather sensor, a humidity sensor, a barometer, a Doppler radar, a light sensor, a thermal imaging device, an infrared camera, an audio sensor, an ultrasound imaging device, a light detection and ranging (LIDAR) sensor, sound navigation and ranging (SONAR) device, a microwave sensor, a chemical sensor, a radiation sensor, an electromagnetic field sensor, a pressure sensor, a spectrum analyzer, a scent sensor, a moisture sensor, a biohazard sensor, a touch sensor, a gyroscope, an altimeter, a microscope, magnetometer, a device capable is seeing through or inside of objects, or any other suitable sensors. In addition, instruments 112, 204 can include tools, non-limiting examples of which include, a projectile launcher, a liquid sprayer, an air blower, a flame thrower, a heat projector, a cold projector, a scent projector, a chemical projector, an electric discharge device, a fire extinguisher, a laser, or any other suitable tools to perform any task. Additionally, instruments 112, 204 can include a display screen, a video projector, an audio speaker, or any other suitable instrument. It is to be appreciated that hospitality light 100, 200 can have configurable instruments. For example, hospitality light 100, 200 can have a modular configuration that allows for one or more instruments to be added or removed by a manufacturer or operator.

A hospitality light 100, 200 can be constructed out of any suitable material appropriate for environments in which the hospitality light 100, 200 will operate. A hospitality light 100, 200 can have suitable protection against an environment in which the hospitality light 100, 200 will operate, non-limiting examples of which include weather resistant, crush resistant, fire resistant, heat resistant, cold resistant, pressure resistant, impact resistant, liquid and/or solid material ingress protection, chemical resistant, corrosion resistant, shatter resistant, scratch resistant, bio-contamination resistant, electromagnetic pulse resistant, electrical shock resistant, projectile resistant, explosion resistant, or any other suitable resistance for an environment in which the hospitality light 100, 200 will operate.

The computer processing systems, computer-implemented methods, apparatus and/or computer program products of hospitality light 100, 200 employ hardware and/or software to solve problems that are highly technical in nature (e.g., related to complex coordination of one or more hospitality lights 100, 200 possibly with other device to perform self-configuration of the one or more hospitality lights 100, 200) that are not abstract and that cannot be performed as a set of mental acts by a human. One or more embodiments of the subject computer processing systems, methods, apparatuses and/or computer program products enable one or more hospitality lights 100, 200 to coordinate amongst themselves, and optionally with other devices, to perform actions to understand the environment in which the one or more hospitality lights 100, 200 is installed, determine an objective of the installation, perform a self-configuration according to the determined objective, and operate to achieve the determined objective. For example, the hospitality lights 100, 200 can employ artificial intelligence to learn their environment, and learn actions to perform to self-configure and operate for a determined objective of the installation in the environment.

Figure 5:
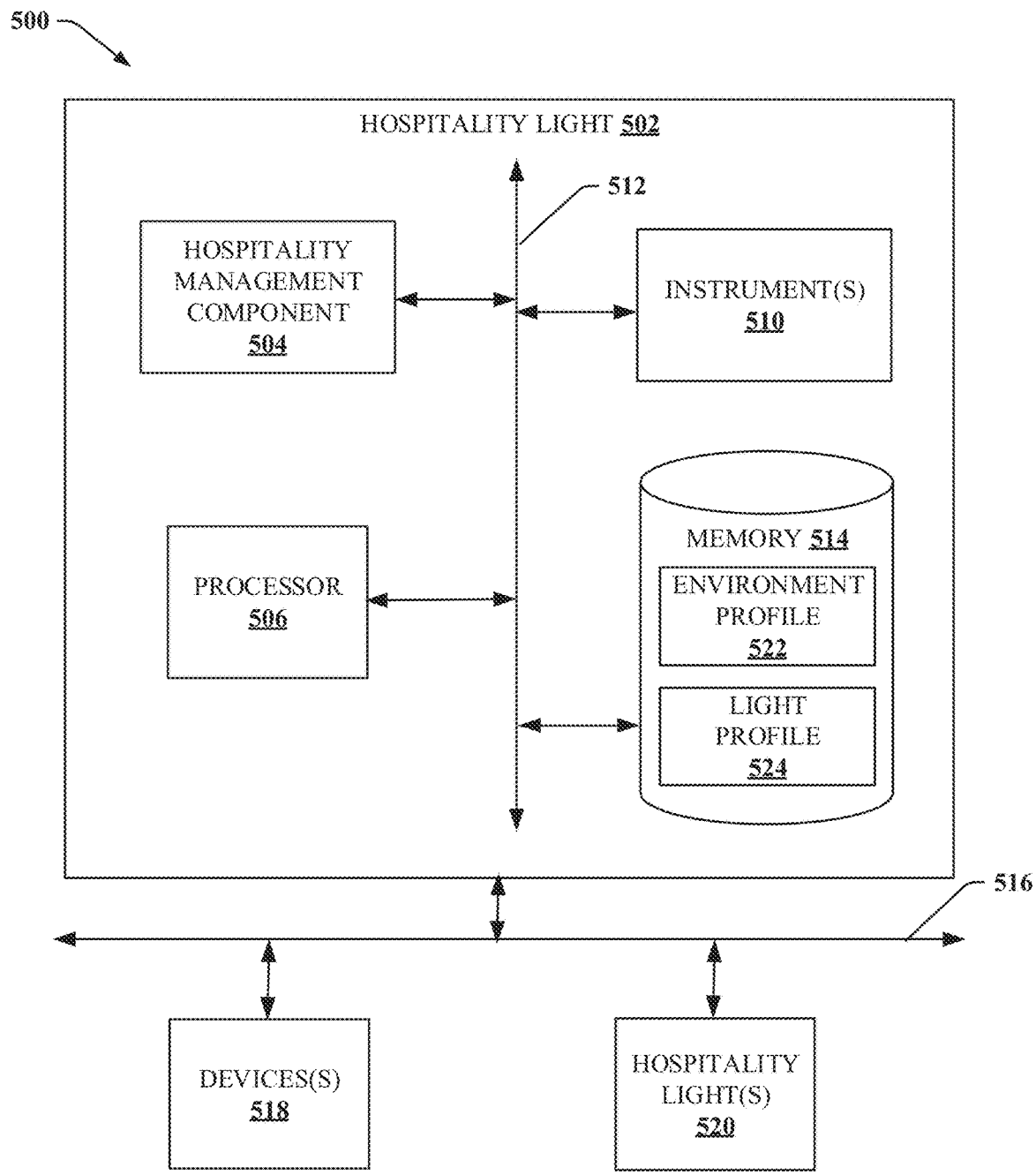
FIG. 5 illustrates a block diagram of an example, non-limiting hospitality light in accordance with one or more embodiments described herein.

FIG. 5 illustrates a block diagram of an example, non-limiting system 500 that facilitates a hospitality light 502 to understand the environment in which the hospitality light 502 is installed, determine an objective of the installation, perform a self-configuration according to the determined objective, and operate to achieve the determined objective in accordance with one or more embodiments described herein. Repetitive description of like elements employed in other embodiments described herein is omitted for sake of brevity.

In some embodiments, the system 500 facilitates a plurality of hospitality lights 502, 520 coordinating together to understand the environment in which the hospitality lights 502, 520 are installed, determine an objective of the installation, perform a self-configuration related to providing hospitality services to guests in the environment according to the determined objective, and operate to achieve the determined objective in accordance with one or more embodiments described herein. Aspects of systems (e.g., system 500 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., one or more computers, one or more computing devices, one or more virtual machines, etc., can cause the one or more machines to perform the operations described.

As shown in FIG. 5, the system 500 can include hospitality lights 502, 520, one or more networks 516, and one or more devices 518. In various embodiments, hospitality lights 502, 520 can be or include the structure and/or functionality of one or more of hospitality lights 100 or 200 and/or any other structure and/or functionality described herein for hospitality lights. In one example, hospitality light 502 can be a different type of hospitality light than hospitality light 520. In another example, a hospitality light 520 can be a hospitality light 502 and/or include one or more components of hospitality light 502. It is to be appreciated that in disclosure herein in which more than one hospitality light is employed, the hospitality lights can include one or more hospitality light 502 and/or one or more hospitality light 520.

Hospitality light 502 can include instruments 510, which can include or be one or more of numerous different types of instruments 112, 204 disclosed herein. Hospitality light 502 can communicate with other hospitality lights 520 and devices 518 over one or more networks 516 via wireless and/or wired communications using instruments 510. Hospitality light 502 can include hospitality management component 504 that can enable hospitality light 502 to understand the environment in which the hospitality light 502 is installed, determine an objective of the installation, perform a self-configuration related to providing hospitality services to guests in the environment according to the determined objective, and operate to achieve the determined objective.

Hospitality light 502 can include or otherwise be associated with at least one memory 514 that can store computer executable components (e.g., computer executable components can include, but are not limited to, the hospitality management component 504, and/or associated components) and can store any data generated or obtained by hospitality light 502 and associated components. Memory 514 can store an environment profile 522 that describes characteristics of an environment in which hospitality light 502 is installed. Memory 514 can store a light profile 524 that can include environment profile 522, and capabilities and configuration of hospitality light 502. Hospitality light 502 can also include or otherwise be associated with at least one processor 506 that executes the computer executable components stored in the memory 514. Hospitality light 502 can further include a system bus 512 that can couple the various components including, but not limited to, hospitality management component 504, instruments 510, memory 514, processor 506, and/or other components.

Device 518 can be any electronic device that can electronically interact (e.g. unidirectional interaction or bidirectional interaction) with hospitality light 502, non-limiting examples of which can include a wearable electronic device or a non-wearable electronic device. It is to be appreciated that interaction can include in a non-limiting example, communication, control, physical interaction, or any other suitable interaction between devices. Wearable device can include, for example, heads-up display glasses, a monocle, eyeglasses, contact lens, sunglasses, a headset, a visor, a cap, a mask, a headband, clothing, or any other suitable device that can be worn by a human or non-human user that comprises electronic components. Non-wearable devices can include, for example, a system (e.g. temperature, humidity, insect repellent, sound, air flow, air quality, windows, robots, or any other suitable systems associated with an environment), a mobile device, a mobile phone, a camera, a camcorder, a video camera, a laptop computer, a tablet device, a desktop computer, a server system, a cable set top box, a satellite set top box, a cable modem, a television set, a monitor, a media extender device, a blu-ray device, a DVD (digital versatile disc or digital video disc) device, a compact disc device, a video game system, a portable video game console, an audio/video receiver, a radio device, a portable music player, a navigation system, a car stereo, a mainframe computer, a robotic device, an artificial intelligence system, a home automation system, a security system, a messaging system, a presentation system, a sound system, a warning system, a fire suppression system, a lighting system, a network storage device, a communication device, a web server device, a network switching device, a network routing device, a gateway device, a network hub device, a network bridge device, a control system, or any other suitable device. Device 518 can be equipped with a communication device that enables device 518 to communicate with hospitality light 502 and/or 520 over network 516. It is to be appreciated that a device 518 can be employed by an operator to interact with a hospitality light 502 and/or 520.

The various components (e.g., hospitality management component 504, instruments 510, memory 514, processor 506, hospitality lights 502, 520, and/or other components) of system 500 can be connected either directly or via one or more networks 516. Such networks 516 can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, electromagnetic induction communication, or any other suitable communication technology.

Figure 6:
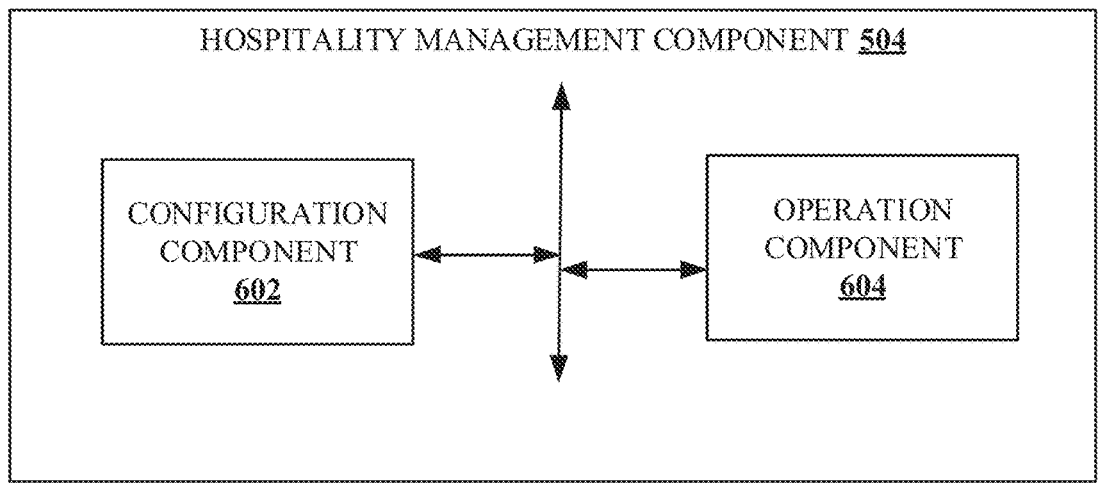
FIG. 6 illustrates a block diagram of an example, non-limiting hospitality management component in accordance with one or more embodiments described herein.

FIG. 6 illustrates a block diagram of an example, non-limiting hospitality management component 504 that can facilitate hospitality light 502 to determine (e.g., ascertain, infer, calculate, predict, prognose, estimate, derive, forecast, detect, and/or compute) characteristics of the environment in which the hospitality light 502 is installed, determine capabilities of hospitality light 502, determine one or more objectives of the installation of hospitality light 502, perform a self-configuration of hospitality light 502 related to providing hospitality services to guests in the environment according to the determined one or more objectives, and determine and execute suitable actions for hospitality light 502 to perform to achieve the determined one or more objectives in accordance with one or more embodiments described herein. Repetitive description of like elements employed in other embodiments described herein is omitted for sake of brevity.

Hospitality management component 504 can include configuration component 602 that can determine characteristics of an environment in which the hospitality light 502 is installed, determine capabilities of hospitality light 502, determine one or more objectives of the installation of hospitality light 502, and perform a self-configuration of hospitality light 502 related to providing hospitality services to guests in the environment according to the determined one or more objectives. Hospitality management component 504 can also include operation component 604 that can monitor characteristics of environment over time, for example, as they relate to providing hospitality services to guests in the environment, and determine and execute suitable actions for hospitality light 502 to perform to achieve the determined one or more objectives related to providing hospitality services to guests in the environment.

Configuration component 602 can employ one or more instruments 510 to obtain information about the environment in which the hospitality light 502 is installed and determine characteristics of the environment. In a non-limiting embodiment, characteristics can include objects, devices, people, flora, fauna, predators, pests, contaminations, colors, scents, biohazards, chemicals, dimensional characteristics, locations, topography, landscape, seascape, boundaries, atmosphere, manmade features, furniture, toys, equipment, machines, vehicles, buildings, grounds, roads, railroad tracks, water feature, rocks, trees, debris, geographic features, unsafe conditions, weather conditions, property line boundary, ground conditions, water conditions, atmospheric conditions, water currents, air currents, water salinity, air temperature, water temperature, ground temperature, ground traction, network topology, or any other suitable characteristics of the environment that can be determined from information obtained by instruments 510.

It is to be appreciated that configuration component 602 can employ intelligent recognition techniques (e.g., spatial relationship recognition, pattern recognition, object recognition, facial recognition, animal recognition, pose recognition, action recognition, shape recognition, scene recognition, behavior recognition, sound recognition, scent recognition, voice recognition, audio recognition, image recognition, motion recognition, hue recognition, feature recognition, edge recognition, texture recognition, timing recognition, location recognition, and/or any other suitable recognition technique) to determine characteristics based on information obtained by one or more instruments 510.

Configuration component 602 can employ one or more sensors as described above to obtain physical information about the physical environment in which hospitality light 502 is installed. In an example, configuration component 602 can employ a camera to obtain visual information about the environment. In another example, configuration component 602 can employ a microphone to obtain audio information about the environment. In a further example, configuration component 602 can employ a GPS device to obtain its location in the environment. In another example, configuration component 602 can employ an LIDAR sensor to obtain mapping information about the environment. In an additional example, configuration component 602 can employ GPS device and LIDAR sensor to map the locations of characteristics recognized in the environment. It is to be appreciated that configuration component 602 can employ any suitable instrument to obtain corresponding information produced by the instrument about the physical environment.

Configuration component 602 can also employ one or more instruments as described above to obtain information about the network environment in which hospitality light 502 is installed. In an example, configuration component 602 can employ a communication device to discover communication networks operating in the environment. Configuration component 602 can connect to one or more of the networks using suitable security and authentication schemes and obtain device information about devices 518 and/or hospitality lights 520 operating on the networks. In a non-limiting example, device information can comprise device type, device model number, device location, device functionality, device configuration, device security, communication protocols supported, or any other suitable attribute of a device 518. It is to be appreciated that configuration component 602 can employ suitable security techniques to prevent unauthorized access to hospitality light 502 while obtaining device information on other devices 118 on the one or more networks. Hospitality light 502 can determine what security and/or communication protocols it should employ and self-configure for operation using the appropriate security and/or communication protocols.

Configuration component 602 can create an environment profile 522 that describes the characteristics of the environment in which hospitality light 502 is installed based on the physical information and the device information obtained by the one or more instruments 510. For example, configuration component 602 can employ intelligent recognition techniques to recognize characteristics of the environment based on the physical information and the device information. In an additional example, configuration component 602 can associate device information obtained from devices 518 with corresponding physical information associated with the devices 518 obtained from sensors. Configuration component 602 can also employ knowledge resources (e.g., internet, libraries, encyclopedias, databases, devices 518, or any other suitable knowledge resources) to obtain detailed information describing the characteristics. For example, configuration component 602 can obtain detailed product information related to recognized characteristics of the environment. In another example, configuration component 602 can obtain risk information related to recognized characteristics of the environment. In a further example, configuration component 602 can obtain information describing interaction between various recognized characteristics of the environment. Configuration component 602 can obtain any suitable information associated with recognized characteristics of the environment from any suitable knowledge resource.

Furthermore, configuration component 602 can generate a confidence metric indicative of a confidence of a determination of a characteristic that has been made by configuration component 602 based on any suitable function. For example, configuration component 602 can employ the multiple sources of information (e.g., physical information, device information, and information from knowledge sources) and perform a cross-check validation across the various sources to generate a confidence metric indicative of a confidence of an accuracy of a determination of a characteristic.

Configuration component 602 can employ the characteristics and any associated obtained information to generate an environment profile 522 that describes the characteristics of the environment. The environment profile 522 can be organized in any suitable manner, non-limiting examples of which include an array, a table, a tree, a map, graph, a chart, a list, network topology, or any other suitable manner of organizing data in a profile. In a non-limiting example, environment profile 522 can include respective entries for each characteristic of the environment that comprise a detailed description of the characteristic, a location of the characteristic in the environment, tracking information describing changes to the characteristic over time, source used to determine the characteristic, confidence of accuracy of the determined characteristic, or any other suitable information associated with the characteristic. Environment profile 522 can include a map of the environment identifying characteristics and their locations on the map.

FIGS. 7A-7J illustrates a block diagram of an example, non-limiting environment 700 in which hospitality lights are installed in accordance with one or more embodiments described herein. For exemplary purposes only, environment 700 is depicted as a hotel.

Figure 7A:
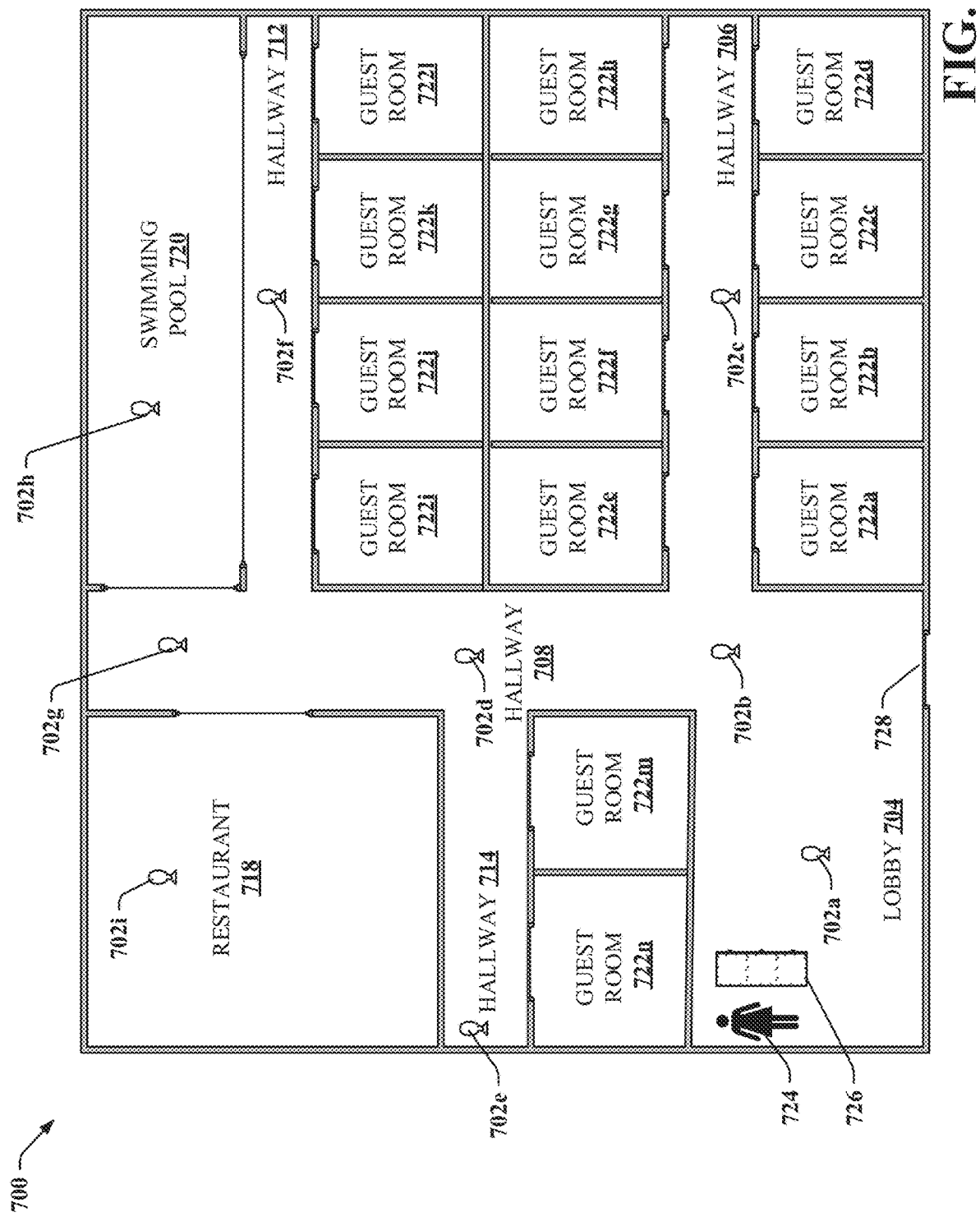
FIGS. 7A-7J illustrate a block diagram of an example, non-limiting environment in which hospitality lights are installed in accordance with one or more embodiments described herein.

Environment 700 has installed hospitality lights 702a, 702b, 702c, 702d, 702e, 702f, 702g, 702h, and 702i which can respectively be or include portions of hospitality light 502. While FIG. 7A depicts eight hospitality lights for exemplary purposes, it is to be appreciated that any suitable quantity of hospitality lights can be installed in an environment.

Hospitality light 702a can employ instruments 510 to determine characteristics of the environment 700 in which it is installed. For example, hospitality light 702a can employ instruments 510 to obtain physical information by recognizing characteristics, such as hotel clerk 724, registration desk 726, and entrance door 728. In a further example, hospitality light 702a can determine lighting conditions at various times of the day, usage of characteristics over time, dimensional information of the characteristics, locations of characteristics, traffic in the environment, changes to characteristics over time, or any other suitable physical information that can be obtained from instruments 510. Additionally, hospitality light 702a can determine where it is located in the room. In another example, hospitality light 702a can employ communication devices to determine and establish communications on networks (e.g. Wi-Fi, home automation, etc.), such as a network on which devices 118 (not shown) installed in environment 700 are communicating and obtain device information from devices 118. Hospitality light 702a can also communicate with one or more knowledge sources to obtain information about characteristics of the environment. It is to be appreciated that hospitality light 702a can also establish a direct communication link (e.g., not through a network) with a device 118 to obtain device information. Hospitality light 702a can also establish communications with one or more of hospitality lights 702b, 702c, 702d, 702e, 702f, 702g, 702h, and 702i and obtain information about environment 700 that those hospitality lights have determined. Hospitality light 702a can determine based on the information (e.g. physical information, device information, and/or information from knowledge sources) that hospitality light 702a is installed in an environment that is lobby 704. Furthermore, hospitality light 702a can determine that it is part of a larger environment 700 that is a hotel based on the information. Hospitality light 702a can generate an environment profile 522 for hospitality light 702a based on the determined characteristics and associated obtained information.

Furthermore, hospitality lights 702b, 702c, 702d, 702e, 702f, 702g, 702h, and 702i can employ instruments 510 to determine physical information, such as characteristics of the environment 700 in which it is installed. For example, hospitality light 702b can recognize characteristics, such as those in lobby 704, hallway 706, and hallway 708, and determine that hospitality light 702b is installed in an environment that is at intersection of lobby 704, hallway 706, and hallway 708. In another example, hospitality light 702c can recognize characteristics, such as doors of guest rooms 722a, 722b, 722c, 722d, 722e, 722f, 722g, and 722h, and determine that hospitality light 702c is installed in an environment that is hallway 706. In an additional example, hospitality light 702d can recognize characteristics, such as those in lobby 704, hallway 708, and hallway 714, and determine that hospitality light 702d is installed in an environment that is at intersection of hallway 708 and hallway 714. In a further example, hospitality light 702e can recognize characteristics, such as doors of guest rooms 722m, and 722m, and determine that hospitality light 702e is installed in an environment that is hallway 714. In another example, hospitality light 702f can recognize characteristics, such as swimming pool 720, and doors of guest rooms 722i, 722j, 722k, and 722l, and determine that hospitality light 702f is installed in an environment that is hallway 712 which runs next to swimming pool 720. In a further example, hospitality light 702g can recognize characteristics, such as swimming pool 720, restaurant 718, hallway 708, and hallway 712, and determine that hospitality light 702g is installed in an environment that is in hallway 708 outside of swimming pool 702g and restaurant 718. In an additional example, hospitality light 702g can recognize characteristics, such as swimming pool 720, and determine that hospitality light 702g is installed in an environment that is in above swimming pool 720. In another example, hospitality light 702i can recognize characteristics, such as dining furniture (not shown) in restaurant 718, and determine that hospitality light 702f is installed in an environment that is restaurant 718.

Furthermore, hospitality lights 702b, 702c, 702d, 702e, 702f, 702g, 702h, and 702i can determine lighting conditions at various times of the day, usage of characteristics over time, dimensional information of the characteristics, locations of characteristics, traffic in the environment, changes to characteristics over time, or any other suitable physical information that can be obtained from instruments 510. One or more of hospitality lights 702a, 702b, 702c, 702d, 702e, 702f, 702g, 702h, and 702i can communicate with each other to obtain information about environment 700 that those hospitality lights have determined. In addition, one or more of hospitality lights 702a, 702b, 702c, 702d, 702e, 702f, 702g, 702h, and 702i can generate a map of environment 700.

Referring back to FIG. 6, configuration component 602 can determine capabilities, such as in a non-limiting example, power sources, computers, processors 506, memories 514, programs, instruments 112, 204, or any other suitable capability of hospitality light 502. In an example, configuration component 602 can probe system bus 512 to determine capabilities of hospitality light 502. In another example, configuration component 602 can examine memory 514 for information on capabilities of hospitality light 502. In a further example, configuration component 602 can obtain information on capabilities of hospitality light 502 from one or more knowledge sources. It is to be appreciated that configuration component 602 can employ any suitable mechanism to determine capabilities of hospitality light 502.

Configuration component 602 can also determine one or more objectives of the installation of hospitality light 502. For example, configuration component 602 can employ artificial intelligence to determine an objective of the installation of hospitality light 502 based on environment profile 522 and determined capabilities of hospitality light 502. In a non-limiting example, an objective can be related to check-in/check-out, directions, activity enhancement, providing instructions, making reservations, concierge, housekeeping, in-room dining service, laundry service, safety, automation, control, communication, economics, notification, coordination, monitoring, intervention, time management, workflow management, or any other suitable objective related to providing hospitality services to guests in the environment. For example, an objective can be related to automatically checking in a guest upon arrival of the environment. In another example, an objective can be to provide directions within the environment, such as to a guest room. In a further example, an objective can be to minimize manual labor to perform housekeeping services. In another example, an objective can be to balance one or more criterion according to a utility analysis (e.g. cost versus benefit). In an additional example, an objective can be to minimize interruption to activities of a set of humans in the environment while satisfying another criterion. Furthermore, a plurality of hospitality lights 502 can coordinate to determine common objectives related to providing hospitality services to guests in the environment. It is to be appreciated that any suitable objective can be determined for the environment.

In an example, configuration component 602 can select objectives from a library of objectives stored in memory 514 or in one or more knowledges sources. In another example, configuration component 602 can create objectives based on artificial intelligence. In a further example, configuration component 602 can create linked objectives, wherein one or more objectives depends on one or more other objectives. For example, an objective can become active if another objective is achieved. In another example, an objective can become inactive if another objective is achieved. It is to be appreciated that configuration component 602 can employ any suitable mechanism to determine objectives of hospitality light 502. In a further example, objectives can be defined by an operator.

Configuration component 602 can also generate a light profile 524 for hospitality light 502 according to the determined one or more objectives. Light profile 524 can comprise environment profile 522 for hospitality light 502, capabilities of hospitality light 502, and objectives of hospitality light 502. Light profile 524 can be organized in any suitable manner, non-limiting examples of which include an array, a table, a tree, a map, graph, a chart, a list, topology, or any other suitable manner of organizing data in a profile. In a non-limiting example, light profile 524 can include respective entries for each objective that comprise a detailed description of the objective, success metrics for the objective, tracking information describing changes to the objective over time, source used to determine the objective, confidence of accuracy of the determined objective, or any other suitable information associated with the objective. Furthermore, configuration component 602 can configure settings of one or more parameters of hospitality light 502 (e.g., of processors, memory, programs, instruments 510, hospitality light bulb 102, hospitality light fixture 202, housing 106, lens 110, light emitting devices, base 108, socket 116, or any other suitable parameters of components of hospitality lights 502) to achieve the one or more objectives, and store the settings in light profile 524.

Referring back to FIG. 6, hospitality management component 504 can include operation component 604 that can determine and execute suitable actions for hospitality light 502 to perform to achieve the determined one or more objectives. For example, operation component 604 can employ artificial intelligence to monitor the environment for conditions of the characteristics according to the determined one or more objectives using instruments 510, determine one or more suitable actions for hospitality light 502 to perform to achieve the determined one or more objectives based on the conditions of the characteristics and the determined capabilities, and execute the one or more suitable actions. In an example, operation component 604 can select actions from a library of actions stored in memory 514 or in one or more knowledges sources. In another example, operation component 604 can create actions to perform based on artificial intelligence. It is to be appreciated that operation component 604 can employ instruments 510 to perform the actions.

In another example, an operator can employ a user interface (not shown) of an application on a device 518 to enter information overriding data in environment profile 522, light profile 524, and/or actions determined by hospitality light 502.

Referring to FIG. 7A again, configuration component 602 of hospitality light 702a can determine hospitality objectives associated with lobby 704. For example, configuration component 602 of hospitality light 702a can determine objectives to greet guests, automatically check-in/check-out guests, and direct guests to their guest rooms. Operation component 604 of hospitality light 702a can determine an action to perform meet objectives to greet guests, automatically check-in/check-out guests, and direct guest to their guest rooms.

Figure 7B:
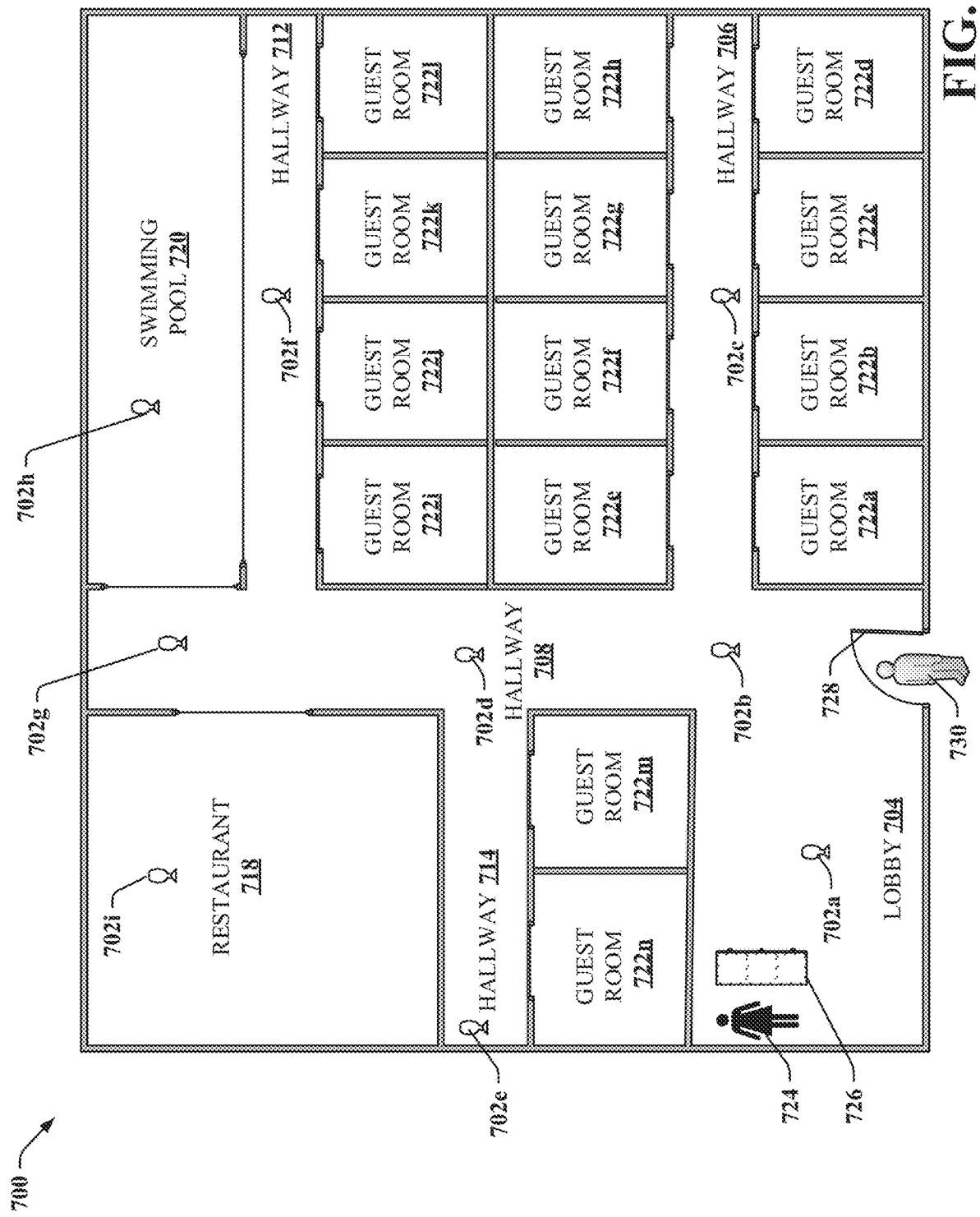

Referring to FIG. 7B, hospitality light 702a can employ instruments 510 to recognize guest 730 entering entrance door 728 and perform actions to automatically check-in guest 730. For example, hospitality light 702a can employ facial recognition to identify the guest. In another example, hospitality light 702a communicate with a mobile phone of guest 730 to identify guest 730. In a further example, hospitality light 702a can access a hotel reservation record for 730 and automatically check-in guest 730. Additionally, hospitality light 702a can determine preferences of guest 730, such by accessing a stored guest profile of guest 730, to determine a preferred guest room for guest 730. For example, hospitality light 702a can check guest 730 into guest room 722f based on their preference. In another example, hospitality light 702a can recognize if guest 730 has luggage and automatically notify (e.g. an audio notification, a visual notification, an electronic message transmission notification to a device 118, or any other suitable notification) a bellman to bring the luggage to a guest room of guest 730. Furthermore, hospitality light 702a can provide a notification of directions to guest 730 to navigate to guest room 722f. For example, hospitality light 702a can send a text message to a device 118 (e.g. mobile phone, smart glasses, etc.) associated of guest 730 with the directions (e.g. text directions, graphical map). In another example, hospitality light 702a can provide audio instruction using an instrument 510, such as using a speaker. In a further example, hospitality light 702a can provide visual instruction using an instrument 510, such by projecting visual indicia.

Figure 7C:
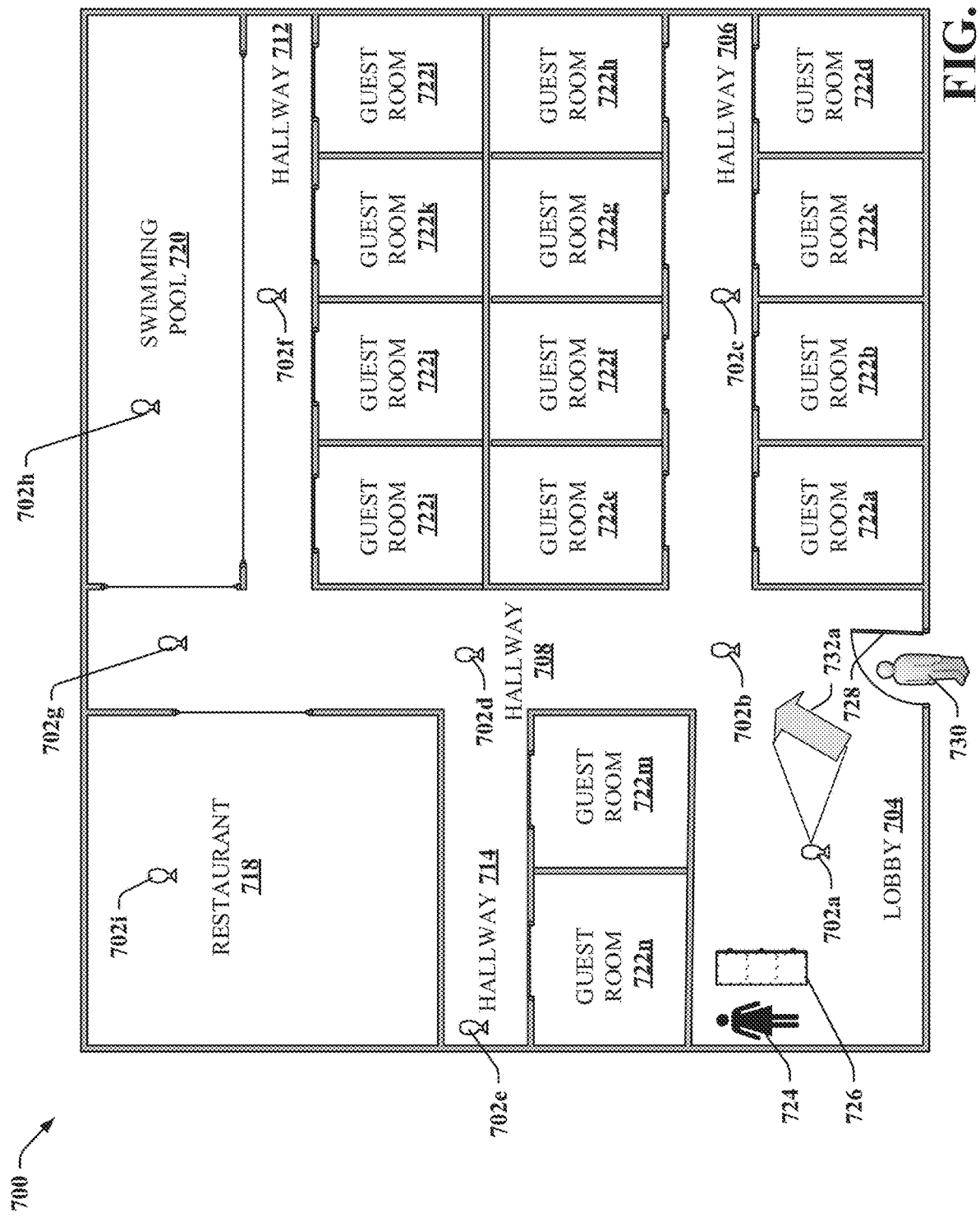
Figure 7D:
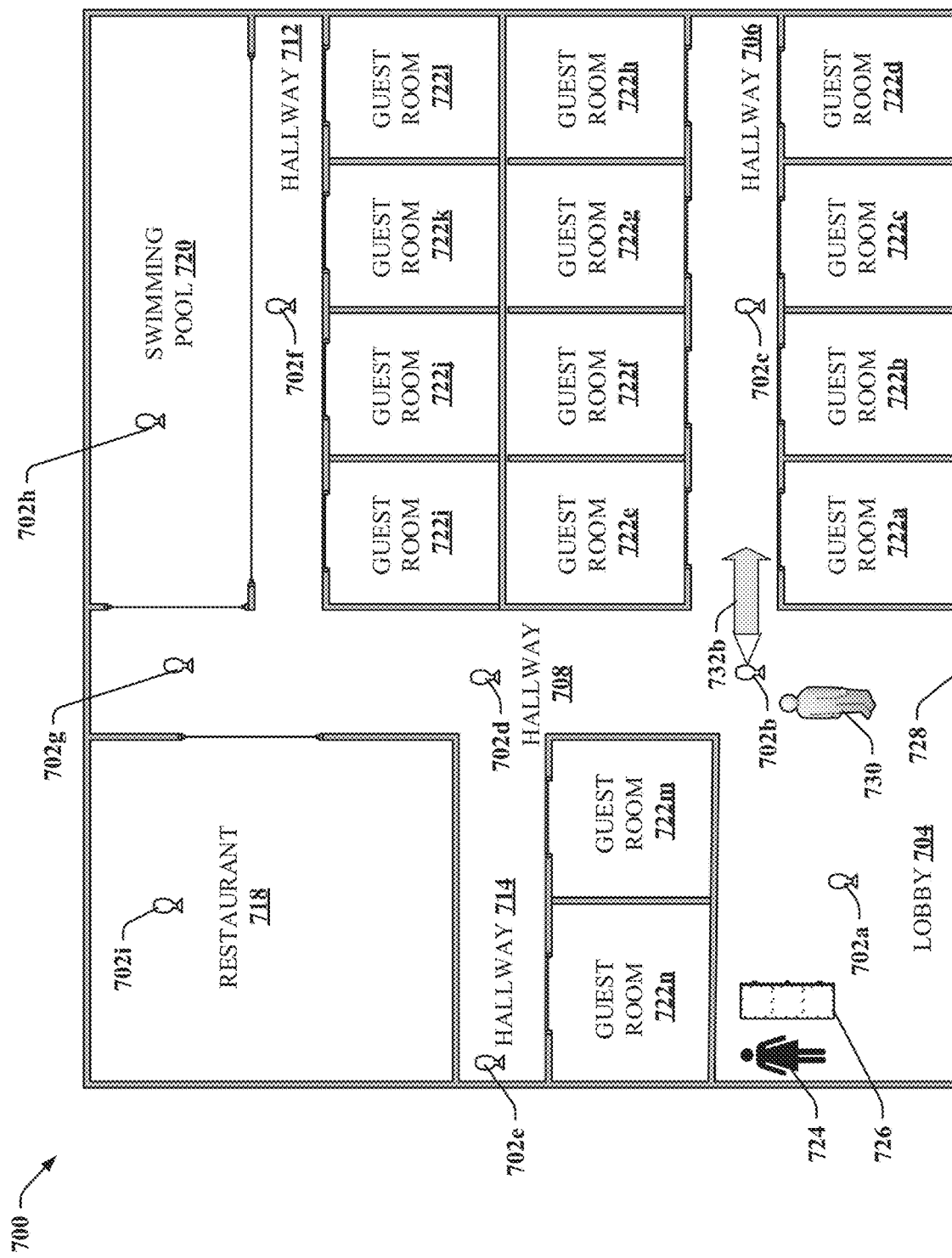
Figure 7E:
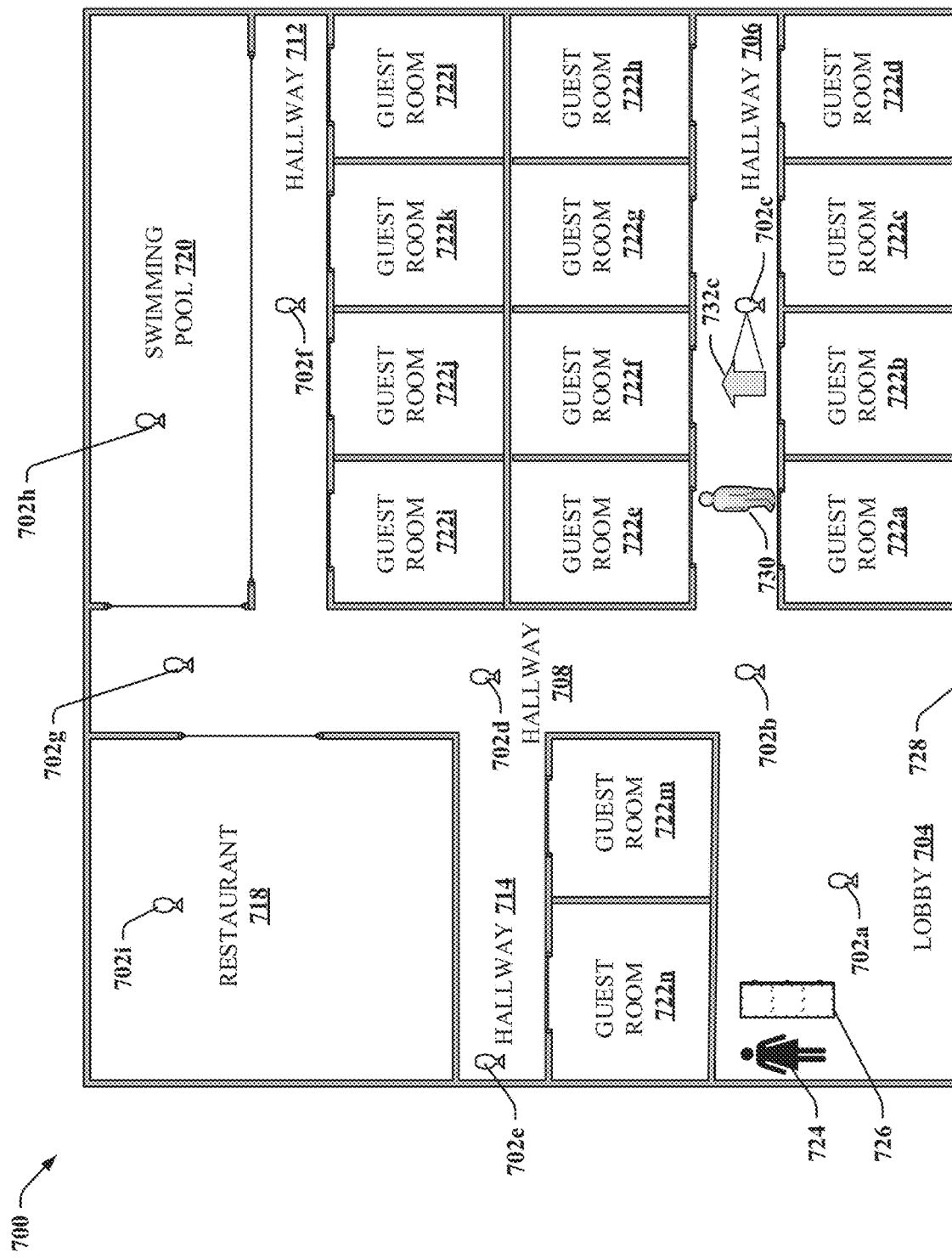

FIG. 7C-7E depict a non-limiting example of hospitality lights 702a, 702b, and 702c coordinating to provide notifications to guide guest 730 to guest room 722f. For example, hospitality light 702a can communicate details of guest 730 and the destination guest room 722f to hospitality lights 702b, and 702c. Hospitality lights 702b, and 702c can recognize guest 730 and provide directions to guest room 722f. In FIG. 7C, hospitality light 702a can project an indication, such as arrow 732a on the floor, pointing in the direction that guest 730 should proceed towards hallway 706. In FIG. 7D, hospitality light 702b can recognize guest 730 approaching and project an indication, such as arrow 732b on the floor, pointing in the direction that guest 730 should proceed down hallway 706 towards guest room 722f. In FIG. 7E, hospitality light 702c can recognize guest 730 approaching and project an indication, such as arrow 732c on the floor, pointing in the direction of guest room 722f. In a further example, hospitality light 702c can automatically unlock a door lock of guest room 722f based on recognition of guest 730. While this non-limiting example depicts hospitality lights providing notification in the form of a projected visual arrow, it is to be appreciated that hospitality lights can provide notifications to guest 730 in any suitable form.

In another example, configuration component 602 can determine an objective to recognize characteristics (e.g. demographics, preferences, profile, objects being carried, clothing, or any other suitable characteristic) of a guest, and operation component 604 can infer a goal of the guest based on the recognized characteristics and execute a hospitality service action appropriate to achieve the goal.

Figure 7F:
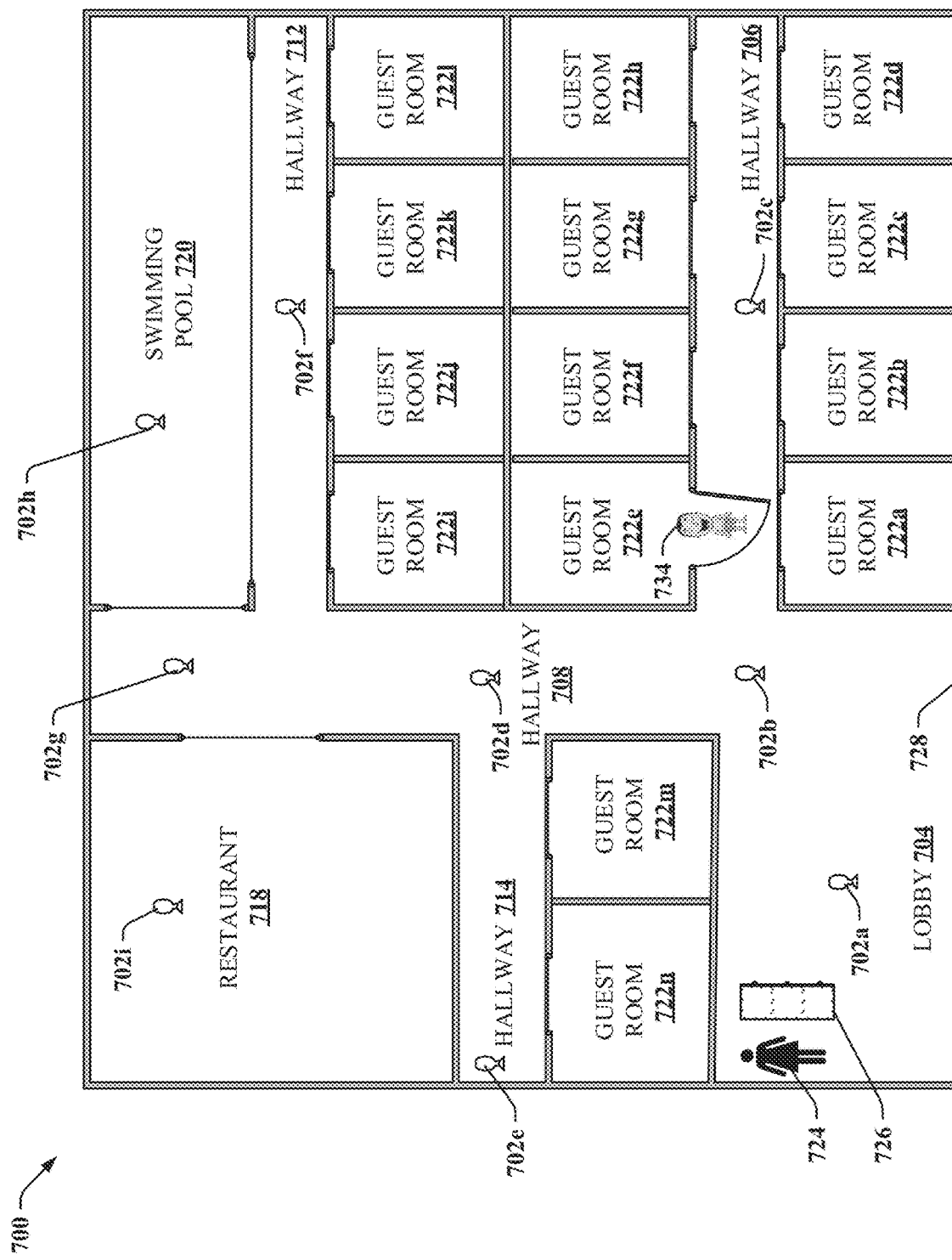

Referring to FIG. 7F, hospitality light 702b can employ recognition techniques to identify guest 734 and determine characteristics, such as guest 734 is a boy wearing a swimsuit. Hospitality light 702b can infer the guest 734 has a goal of going to swimming pool 720. In an example, hospitality light 702b can optionally ask guest 734 if they would like directions to swimming pool 720. Hospitality light 702b, can coordinate with hospitality lights 702d and 702g to provide notifications to guide guest 734 to swimming pool 720.

Figure 7G:
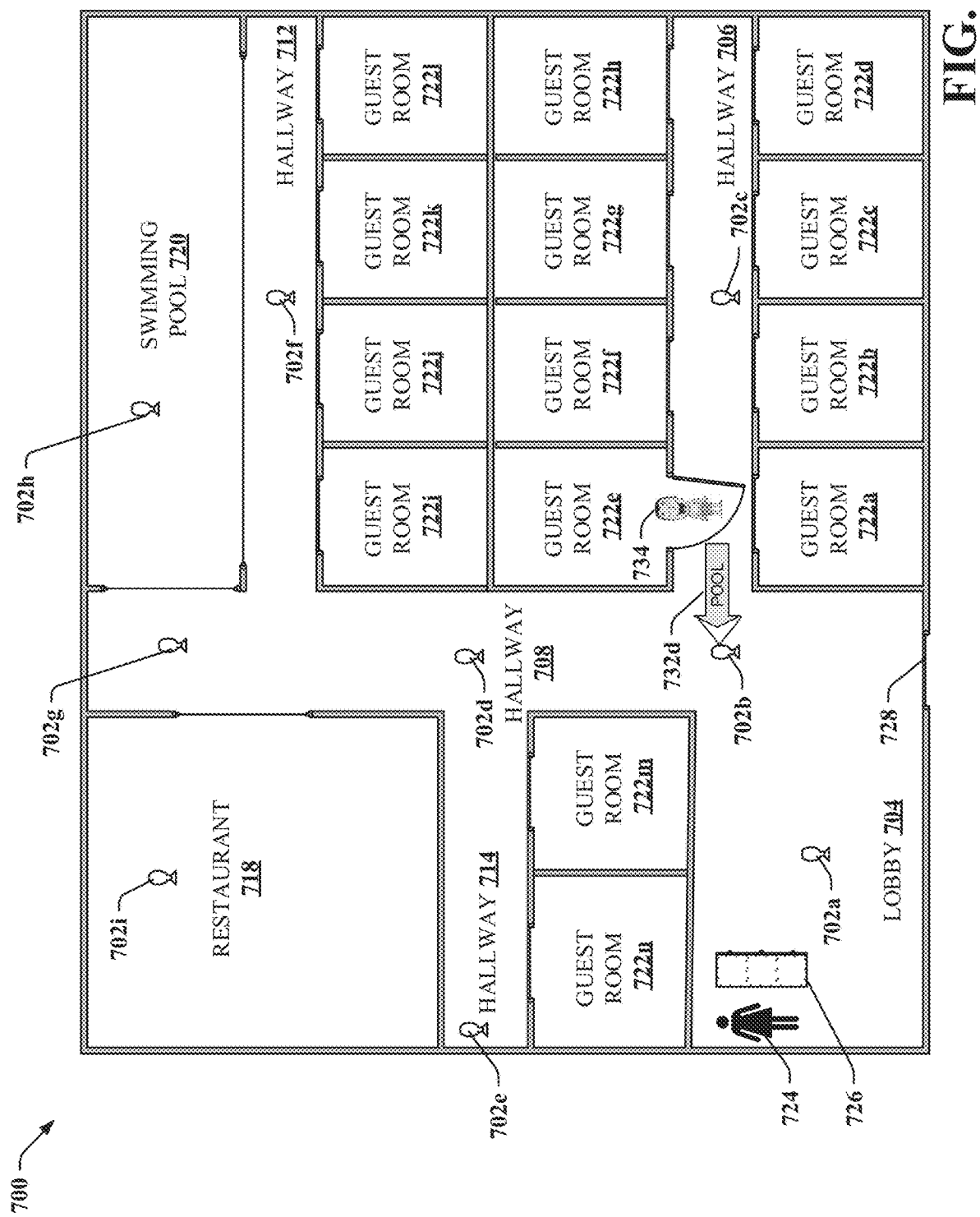
Figure 7H:
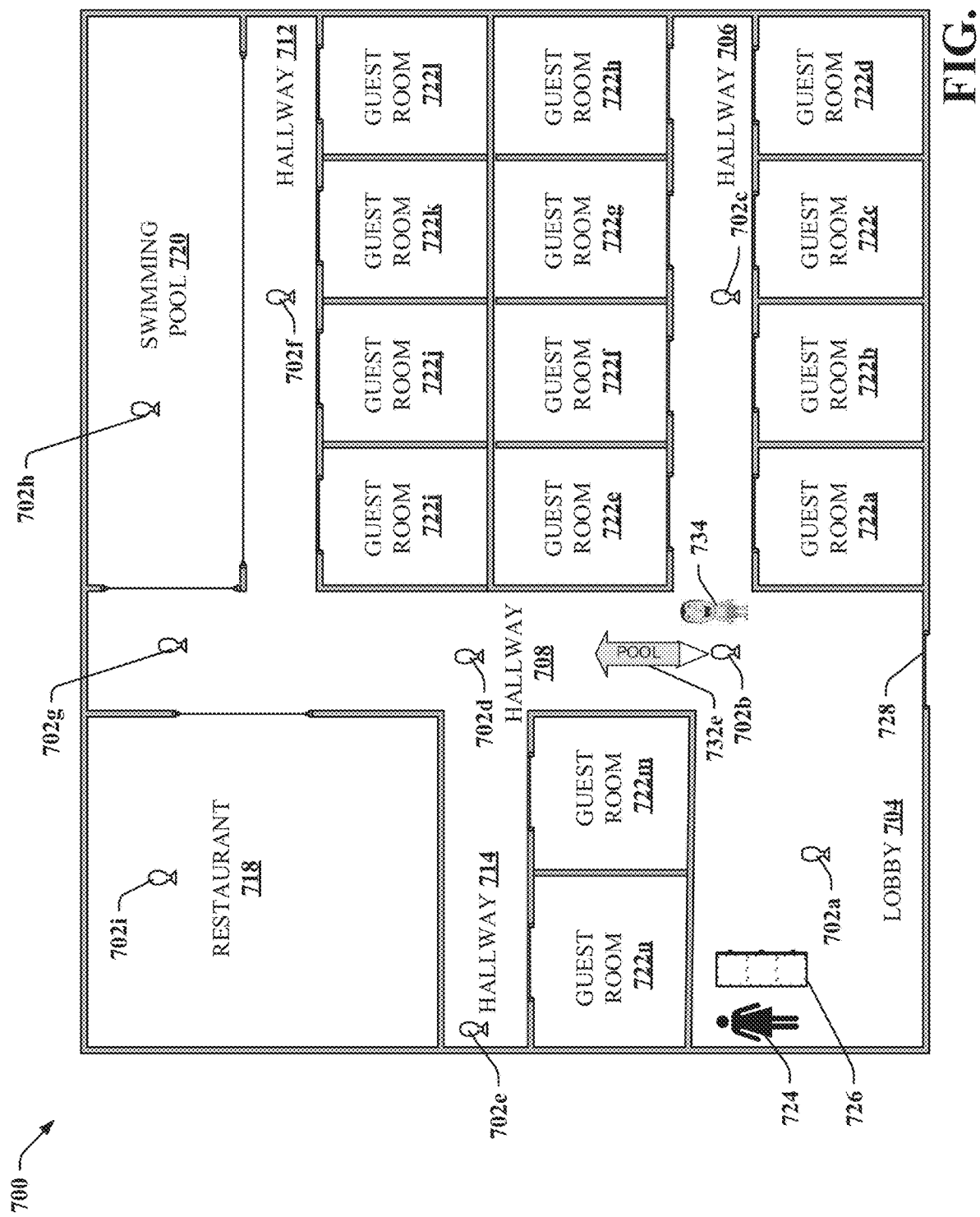
Figure 7I:
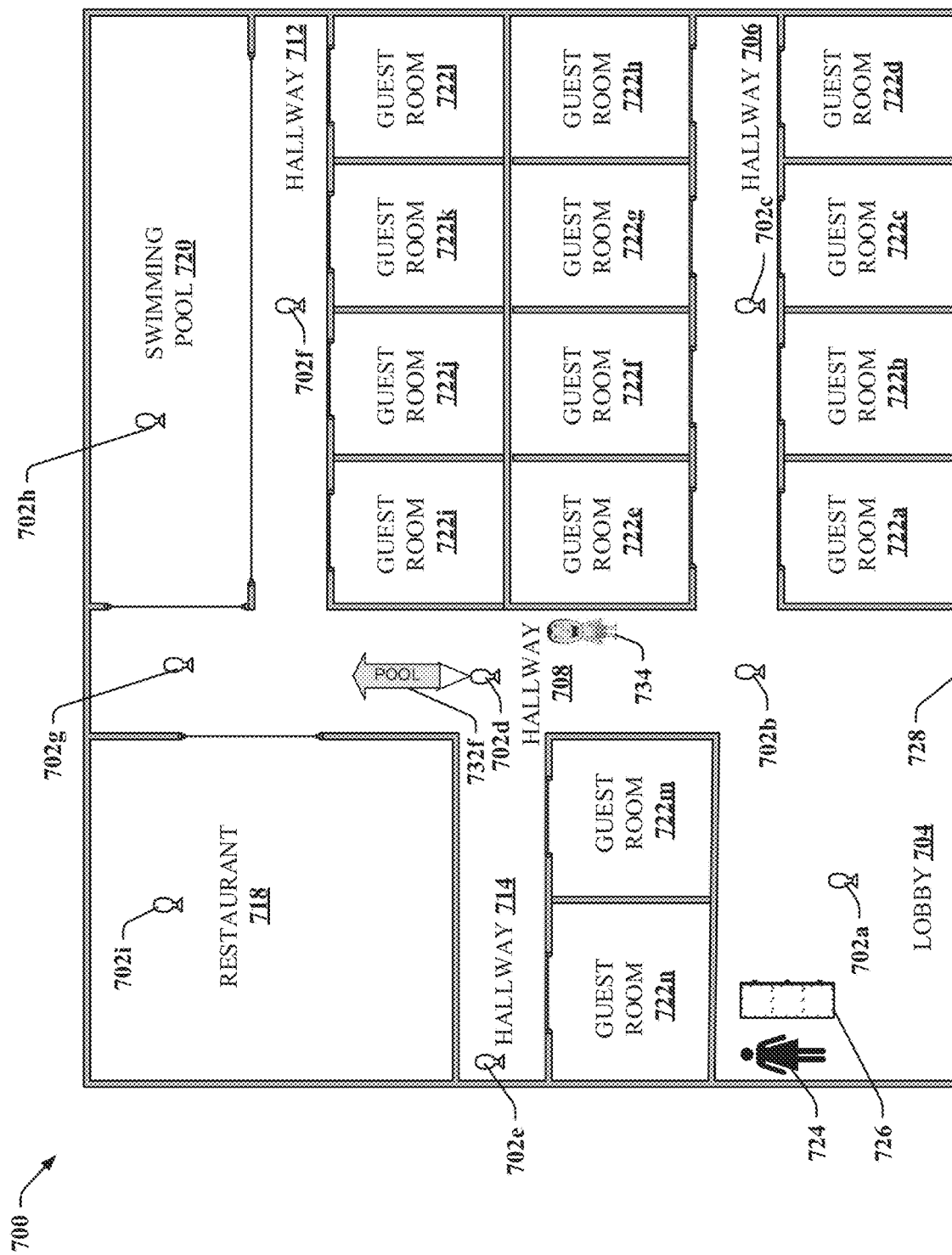
Figure 7J:
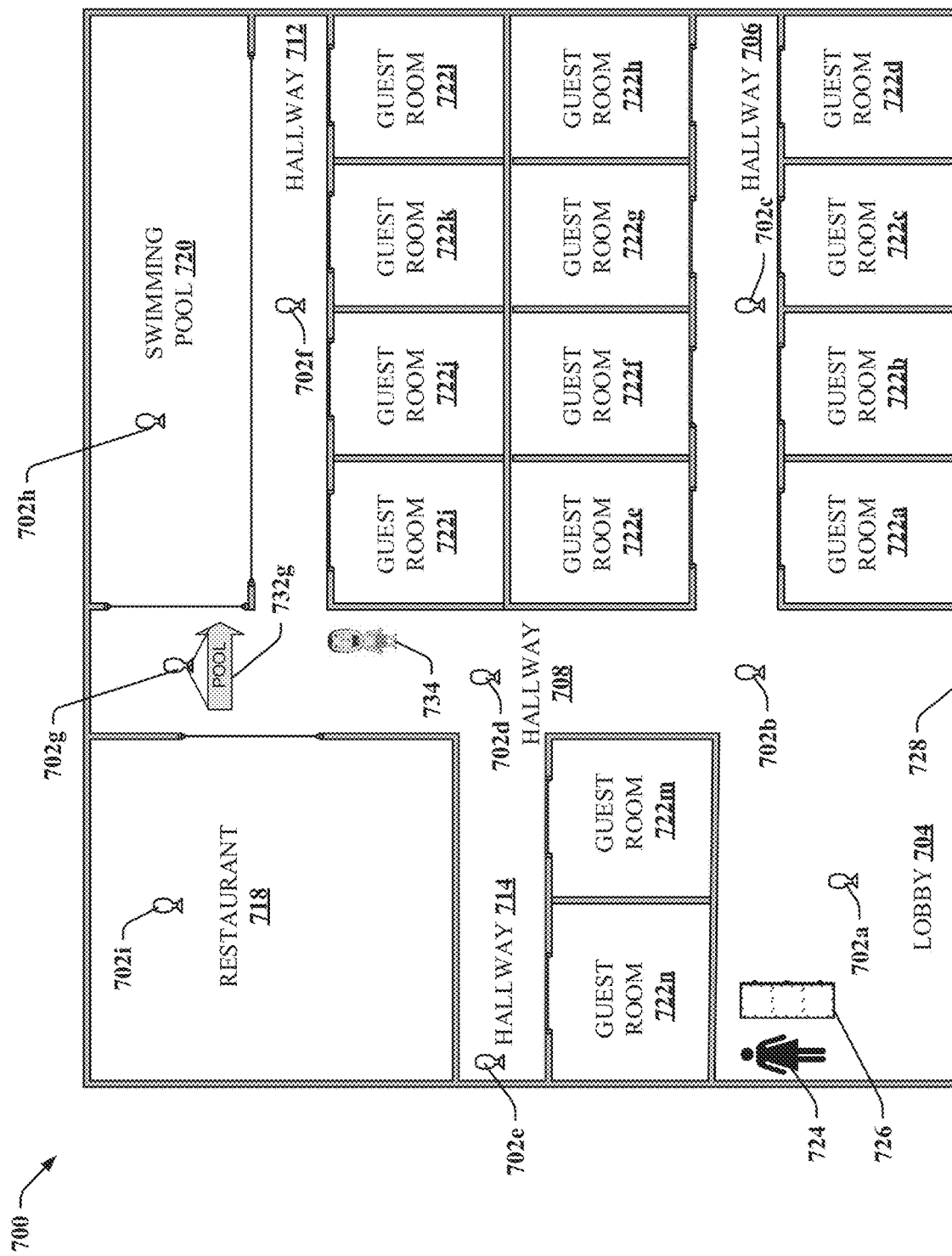

FIG. 7G-7J depict a non-limiting example of hospitality lights 702b, 702d, and 702g coordinating to provide notifications to guide guest 734 to swimming pool 720. In FIG. 7G, hospitality light 702b can project an indication, such as arrow 732d on the floor, pointing in the direction that guest 730 should proceed towards hallway 708. In this example, arrow 732d includes text "POOL" to indicate the destination. In FIG. 7H, hospitality light 702b can recognize guest 734 has reached hallway 708 and project an indication, such as arrow 732d on the floor, pointing in the direction that guest 734 should proceed down hallway 708 towards swimming pool 720. In FIG. 7I, hospitality light 702d can recognize guest 734 approaching and project an indication, such as arrow 732f on the floor, pointing in the direction of swimming pool 720. In FIG. 7J, hospitality light 702g can recognize guest 734 approaching and project an indication, such as arrow 732g on the floor, pointing in the direction of swimming pool 720. In a further example, hospitality light 702g can inform hospitality light 702h and/or hospitality light 702f that guest 734 is approaching swimming pool 720. One or more of hospitality lights 702f, 702g, or 702h can activate an objective of safety monitoring of guest 734 while they are in swimming pool 720. For example, hospitality lights 702f, 702g, or 702h can monitor guest 734 while they are in swimming pool 720 and take actions to maintain safety of guest 734. For example, if guest 734 appears to be in distress in swimming pool 720, one or more of hospitality lights 702f, 702g, or 702h can generate a notification to hotel staff or initiate an alarm (e.g. audio and/or visual) to indicate that guest 734 appears to be in distress in swimming pool 720. In another example, if guest 734 is playing in an unsafe manner (e.g. diving in the pool, running around the pool, etc.), one or more of hospitality lights 702f, 702g, or 702h can provide an audio warning to guest 734 to stop playing in the unsafe manner, and if guest 734 does not stop, generate a notification to hotel staff or initiate an alarm (e.g. audio and/or visual) to indicate that guest 734 is playing in an unsafe manner around swimming pool 720.

FIG. 8 illustrates a block diagram of an example, non-limiting environment 800 in which a hospitality light 802 is installed in accordance with one or more embodiments described herein. For exemplary purposes only, environment 800 is depicted as a hotel guest room 804.

Hospitality light 802 can employ recognition techniques to identify guest 806 and determine characteristics, such as guest 806 is a man wearing a suit and carrying a briefcase. Hospitality light 802 can infer the guest 806 has a goal of going to a business event. In an example, hospitality light 802 can ask guest 806 if they would need a hospitality service associated with a business event, such calling a taxi, directions to a destination outside of the hotel, or any other suitable hospitality service. Hospitality light 802, can perform an appropriate action based on the response of guest 806, such as calling a taxi or sending directions to the destination to a mobile device of guest 806.

Figure 9:
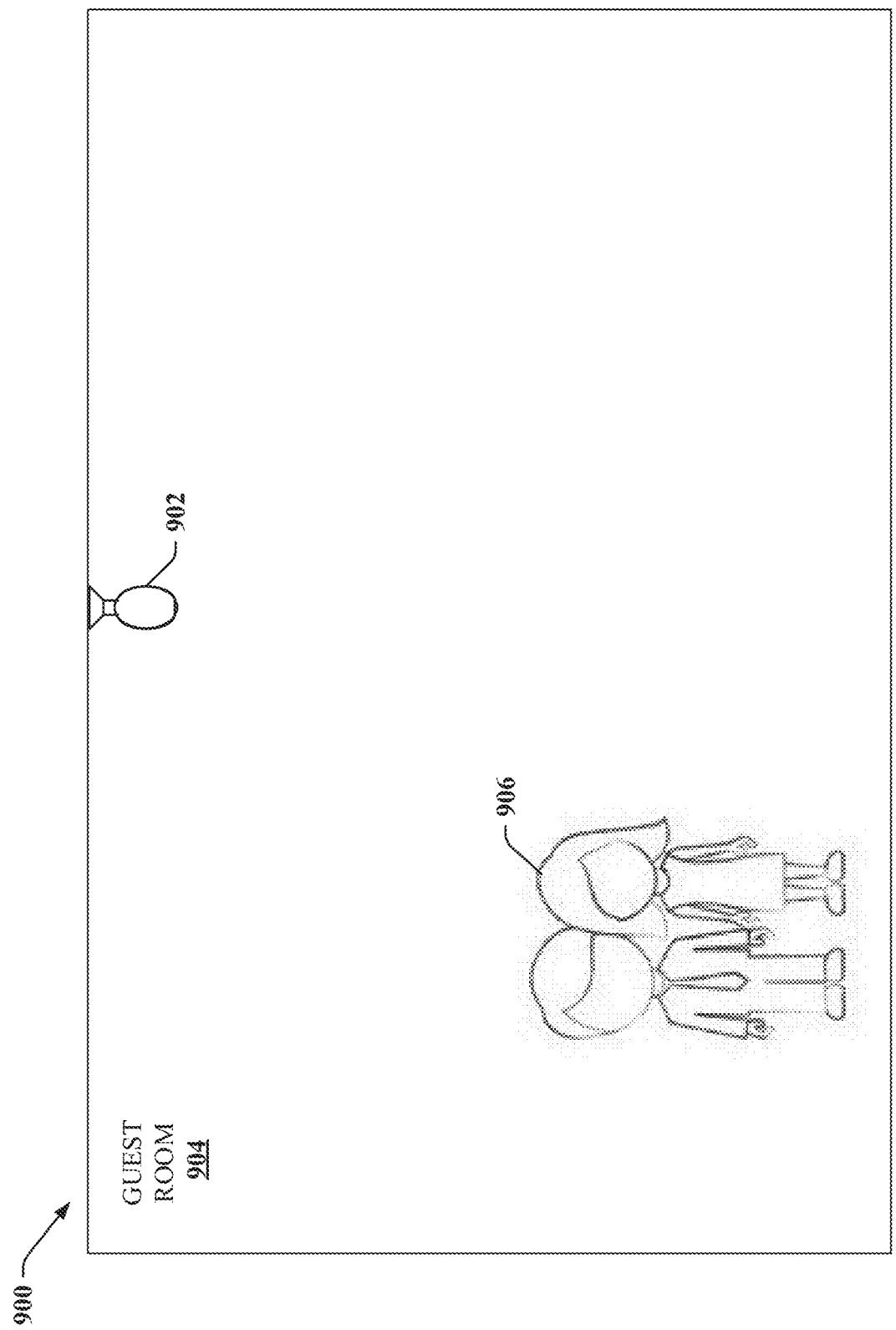
FIG. 9 illustrates a block diagram of an example, non-limiting environment in which a hospitality light is installed in accordance with one or more embodiments described herein.

FIG. 9 illustrates a block diagram of an example, non-limiting environment 900 in which a hospitality light 902 is installed in accordance with one or more embodiments described herein. For exemplary purposes only, environment 800 is depicted as a hotel guest room 904.

Hospitality light 902 can employ recognition techniques to identify guests 906 and determine characteristics, such as guests 906 is a couple dressing to go out for the evening. Hospitality light 902 can infer that guests 906 have a goal of going out for the evening. In an example, hospitality light 902 can ask guests 906 if they need a hospitality service associated with a going out for the evening, such getting a reservation at a restaurant, places to go dancing, events going on tonight in the area, local attractions to see, or any other suitable hospitality service. Hospitality light 902, can provide recommendations for destinations to guests 906 based on their responses. Furthermore, hospitality light 902 can make arrangements for the destination (e.g. book a reservation, purchasing tickets, generating a map with directions, calling a taxi, or any other suitable arrangement).

Figure 10:
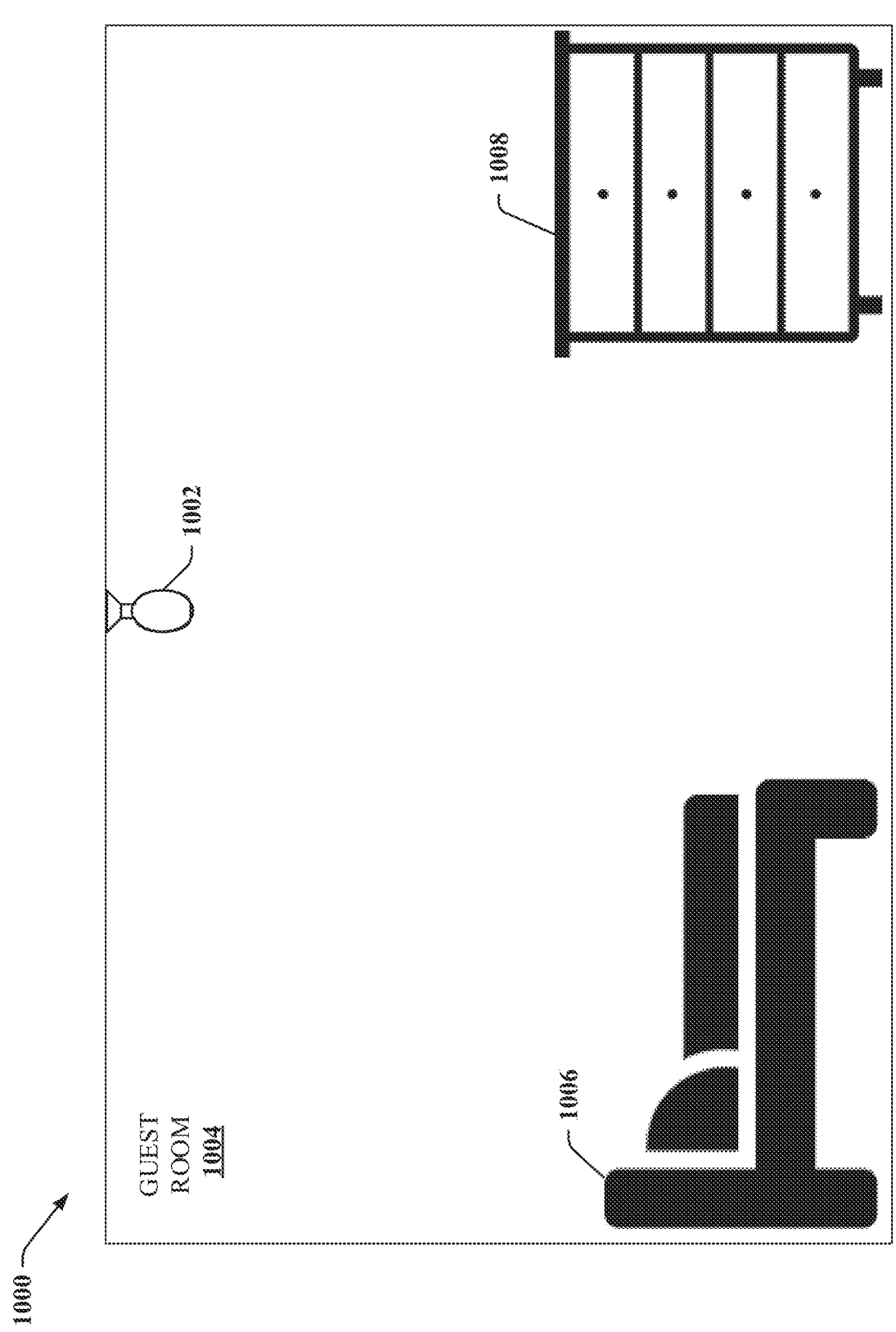
FIG. 10 illustrates a block diagram of an example, non-limiting environment in which a hospitality light is installed in accordance with one or more embodiments described herein.

FIG. 10 illustrates a block diagram of an example, non-limiting environment 1000 in which a hospitality light 1002 is installed in accordance with one or more embodiments described herein. For exemplary purposes only, environment 1000 is depicted as a hotel guest room 1004.

Hospitality light 1002 can employ recognition techniques to identify that guests staying in guest room 1004 are currently out of the room. Hospitality light 1002 can infer that this would be a good time for housekeeping to clean the room as not to disturb the guests. Hospitality light 1002 can notify housekeeping staff that guest room 1004 is available to be cleaned. In another example, hospitality light 1002 can also determine a cleanliness state of guest room 1004 or an estimate of the amount of time needed to clean guest room 1004, and inform housekeeping. In this manner housekeeping staff can utilize this information to coordinate assignment of staff to clean guest room 1004 along with other guest rooms to optimize a criterion (e.g. cost, time, usage of supplies, or any other suitable criterion). In another example, hospitality light 1002 can coordinate with other hospitality lights in other guest rooms to automatically schedule housekeeping staff to clean guest rooms based on the information obtained by the hospitality rooms about the guest rooms.

Figure 11:
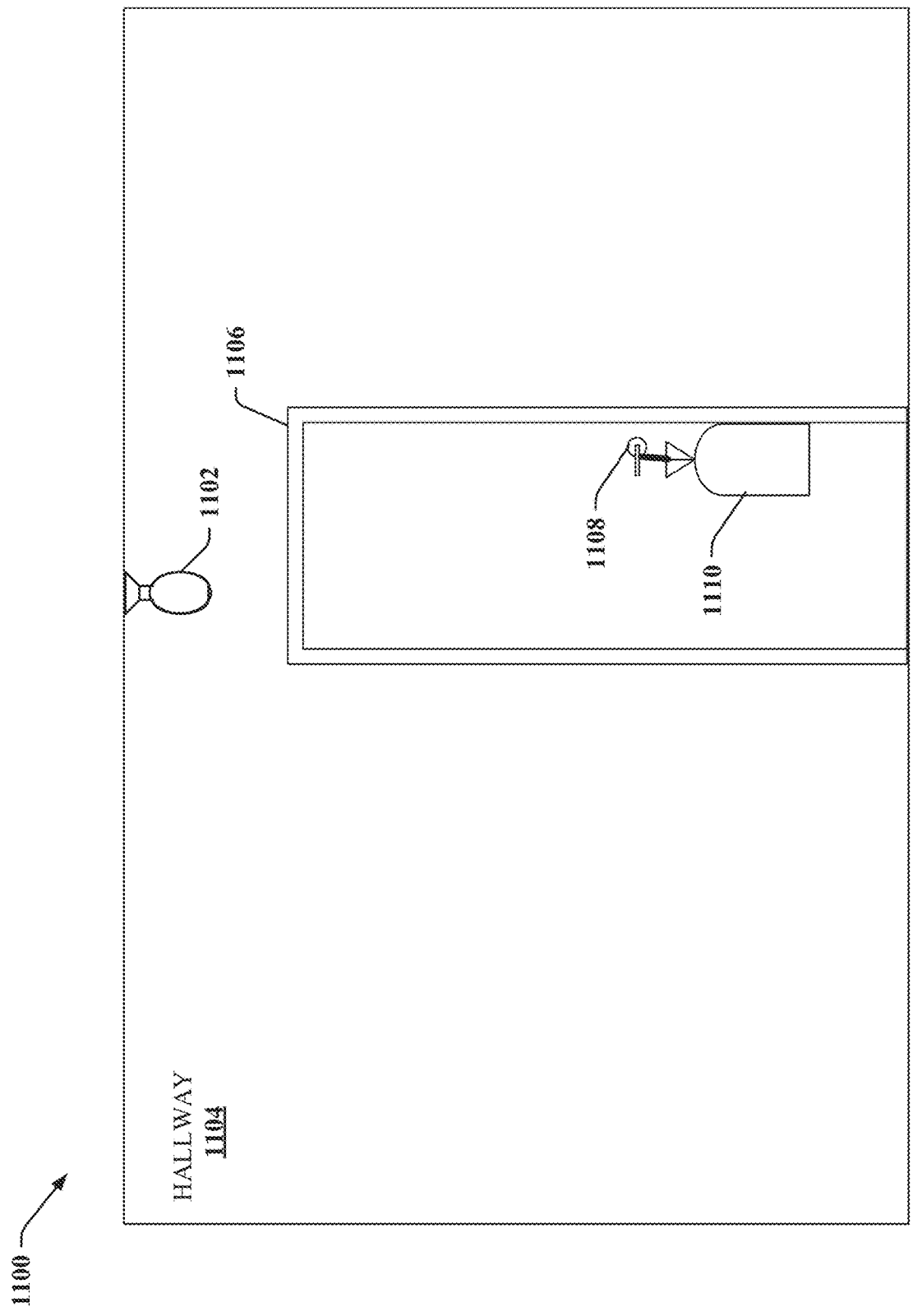
FIG. 11 illustrates a block diagram of an example, non-limiting environment in which a hospitality light is installed in accordance with one or more embodiments described herein.

FIG. 11 illustrates a block diagram of an example, non-limiting environment 1100 in which a hospitality light 1102 is installed in accordance with one or more embodiments described herein. For exemplary purposes only, environment 1100 is depicted as a hotel hallway 1104 with bed 1006 and dresser 1008.

Hospitality light 1102 can employ recognition techniques to identify that there is a laundry bag 1110 hanging on door handle 1108 of door 1106. Hospitality light 1102 can infer that guest in the guest room associated with door 1106 would like their laundry cleaned. Hospitality light 1102 can notify housekeeping staff that laundry bag 1110 hanging on door handle 1108 of door 1106 need to be picked up. In another example (not shown), hospitality light 1102 can recognize different types of hanging tags on door handle 1108 and perform appropriate actions according to the type of hanging tag. For example, if a hanging tag indicates "DO NOT DISTURB", hospitality light 1102 can delay housekeeping staff from cleaning the room until the hanging tag indicated "DO NOT DISTURB" is removed. In a further example, if a hanging tag indicated "CLEAN ROOM", hospitality light 1102 can let housekeeping staff know that the guest wants the guest room associated with door 1106 to be cleaned. In a further example (not shown), hospitality light 1102 can recognize a in-room dining service tray on the floor outside of door 1106 and notify housekeeping staff to pick of the in-room dining service tray on the floor outside of door 1106.

Referring back to FIG. 5, hospitality light 502 can recognize a guest in an environment and determine characteristics (e.g. demographics, preferences, profile, objects being carried, clothing, or any other suitable characteristic) of a guest, and project an advertisement (e.g. logo, coupon, video, etc.) for a product and/or company in the environment selected based on the determined characteristics of the guest. As a guest moves around the environment one or more hospitality lights can project different advertising logos for one or more products and/or companies in the environment on the determined characteristics of the guest. It is to be appreciated that the advertisement can be an audio advertisement, visual advertisement, and/or electronic advertisement transmission to a mobile device associated with a guest.

In another example, hospitality light 502 can learn preferences of a guest (e.g. lighting preference, entertainment preference, dining preference, activity preference, cleaning preference, or any other suitable guest preference), and perform actions according to the learned preferences, such as adjusting lighting output, playing music in the guest room, setting a television channel on a television in a guest room, making restaurant reservations, scheduling housekeeping, recommending activities, or any other suitable action.

While FIGS. 5 and 6 depict separate components in hospitality light 502, it is to be appreciated that two or more components can be implemented in a common component. Further, it is to be appreciated that the design of the hospitality light 502 can include other component selections, component placements, etc., to facilitate determining characteristics of the environment in which the hospitality light 502 is installed, determining capabilities of hospitality light 502, determining one or more objectives of the installation of hospitality light 502, performing a self-configuration of hospitality light 502 according to the determined one or more objectives, and determining and executing suitable actions for hospitality light 502 to perform to achieve the determined one or more objectives in accordance with one or more embodiments described herein. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed may be performed by specialized computers for carrying out defined tasks related to determining characteristics of the environment in which the hospitality light 502 is installed, determining capabilities of hospitality light 502, determining one or more objectives of the installation of hospitality light 502, performing a self-configuration of hospitality light 502 according to the determined one or more objectives, and determining and executing suitable actions for hospitality light 502 to perform to achieve the determined one or more objectives. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to systems for determining characteristics of the environment in which the hospitality light 502 is installed, determining capabilities of hospitality light 502, determining one or more objectives of the installation of hospitality light 502, performing a self-configuration of hospitality light 502 according to the determined one or more objectives, and determining and executing suitable actions for hospitality light 502 to perform to achieve the determined one or more objectives by improving processing efficiency among processing components in these systems, reducing delay in processing performed by the processing components, reducing memory requirements, and/or improving the accuracy in which the processing systems are determining characteristics of the environment in which the hospitality light 502 is installed, determining capabilities of hospitality light 502, determining one or more objectives of the installation of hospitality light 502, performing a self-configuration of hospitality light 502 according to the determined one or more objectives, and determining and executing suitable actions for hospitality light 502 to perform to achieve the determined one or more objectives.

It is to be appreciated that the any criterion or threshold disclosed herein can be pre-defined, operator specified, and/or dynamically determined, for example, based on learning algorithms.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z_1, z_2, z_3, z_4, z_n)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 12:
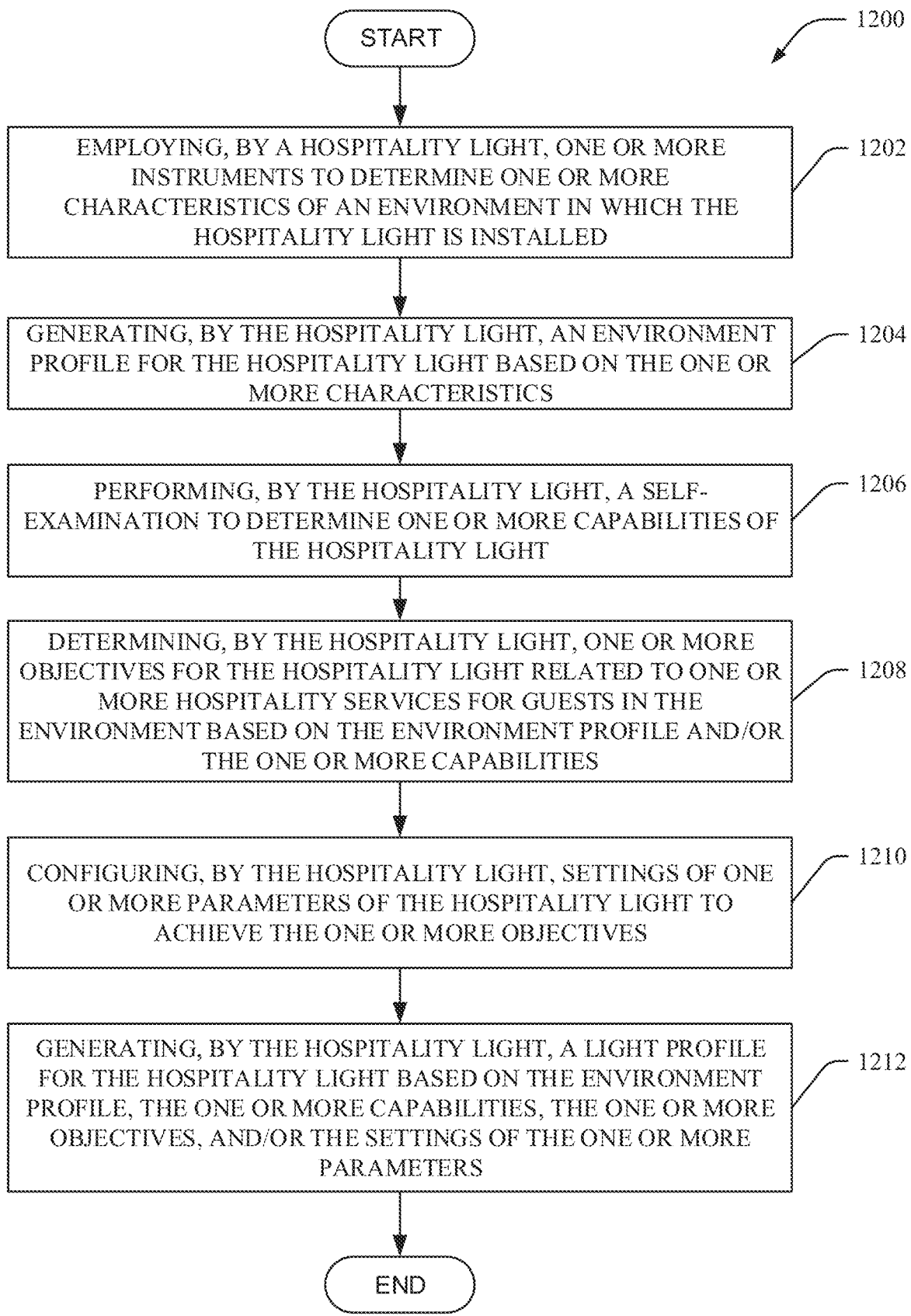
FIG. 12 illustrates a flow diagram of an example, non-limiting computer-implemented method that facilitates self-configuration of a hospitality light in accordance with one or more embodiments described herein.

FIG. 12 illustrates a flow diagram of an example, non-limiting computer-implemented method 1200 that facilitates hospitality light 502 determining characteristics of the environment in which the hospitality light 502 is installed, determining capabilities of hospitality light 502, determining one or more objectives of the installation of hospitality light 502, and performing a self-configuration of hospitality light 502 according to the determined one or more objectives in accordance with one or more embodiments described herein. Repetitive description of like elements employed in other embodiments described herein is omitted for sake of brevity.

At 1202, method 1200 comprises employing, by a hospitality light, one or more instruments to determine one or more characteristics of an environment in which the hospitality light is installed (e.g., via configuration component 602, hospitality management component 504, and/or hospitality light 502). At 1204, method 1200 comprises generating, by the hospitality light, an environment profile for the hospitality light based on the one or more characteristics (e.g., via configuration component 602, hospitality management component 504, and/or hospitality light 502). At 1206, method 1200 comprises performing, by the hospitality light, a self-examination to determine one or more capabilities of the hospitality light (e.g., via configuration component 602, hospitality management component 504, and/or hospitality light 502). At 1208, method 1200 comprises determining, by the hospitality light, one or more objectives for the hospitality light related to one or more hospitality services for guests in the environment based on the environment profile and/or the one or more capabilities (e.g., via configuration component 602, hospitality management component 504, and/or hospitality light 502). At 1210, method 1200 comprises configuring, by the hospitality light, settings of one or more parameters of the hospitality light to achieve the one or more objectives (e.g., via configuration component 602, hospitality management component 504, and/or hospitality light 502). At 1212, method 1200 comprises generating, by the hospitality light, a light profile for the hospitality light based on the environment profile, the one or more capabilities, the one or more objectives, and/or the settings of the one or more parameters (e.g., via configuration component 602, hospitality management component 504, and/or hospitality light 502).

Figure 13:
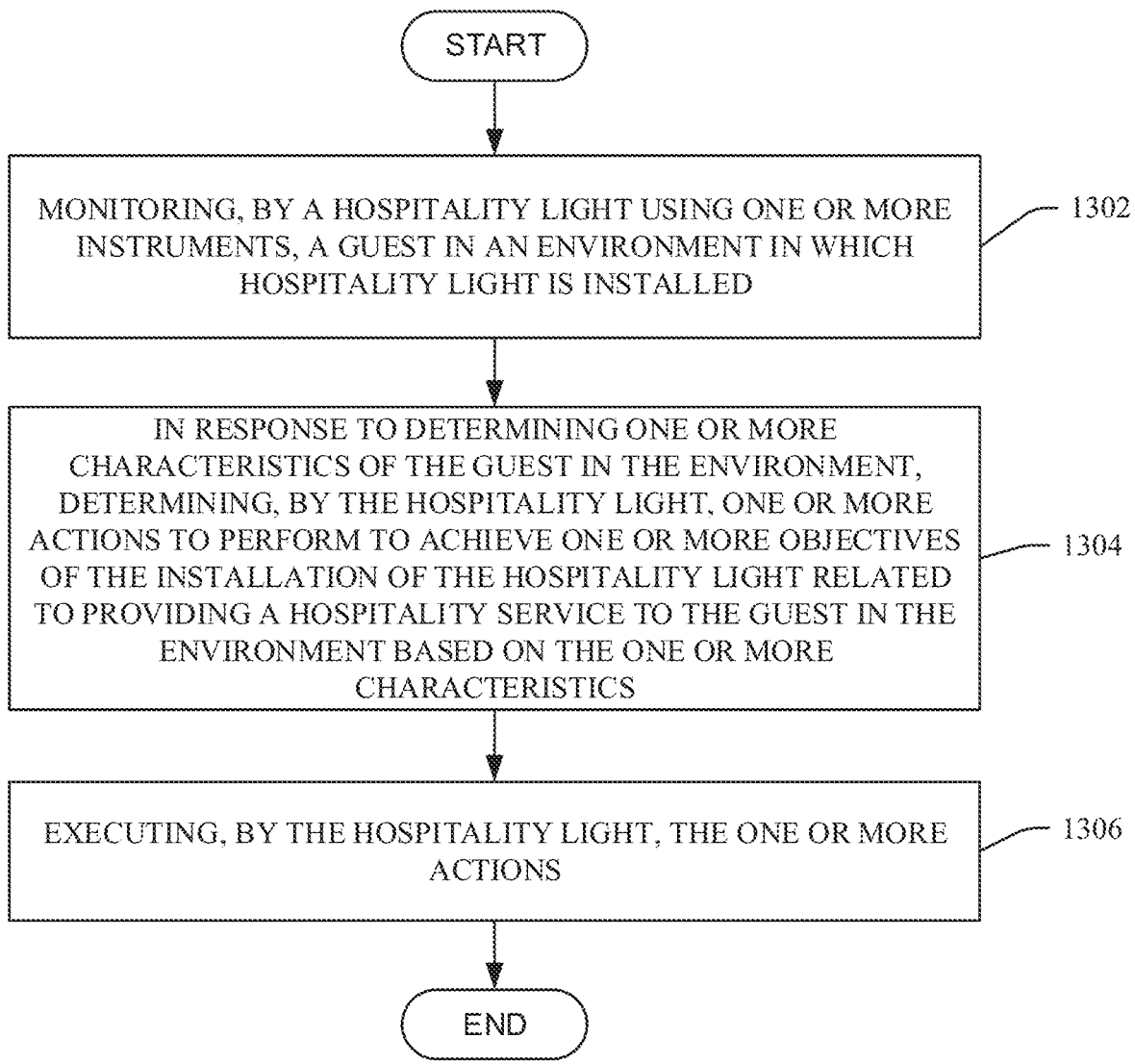
FIG. 13 illustrates a flow diagram of an example, non-limiting computer-implemented method that facilitates operation of a hospitality light in accordance with one or more embodiments described herein.

FIG. 13 illustrates a flow diagram of an example, non-limiting computer-implemented method 1300 that facilitates hospitality light 502 determining and executing suitable actions for hospitality light 502 to perform to achieve the determined one or more objectives in accordance with one or more embodiments described herein. Repetitive description of like elements employed in other embodiments described herein is omitted for sake of brevity.

At 1302, method 1300 comprises monitoring, by a hospitality light using one or more instruments, a guest in an environment in which hospitality light is installed (e.g., via operation component 604, hospitality management component 504, and/or hospitality light 502). At 1304, method 1300 comprises in response to determining one or more characteristics of the guest in the environment, determining, by the hospitality light, one or more actions to perform to achieve one or more objectives of the installation of the hospitality light related to providing a hospitality service to the guest in the environment based on the one or more characteristics (e.g., via operation component 604, hospitality management component 504, and/or hospitality light 502). At 1306, method 1300 comprises executing, by the hospitality light, the one or more actions (e.g., via operation component 604, hospitality management component 504, and/or hospitality light 502).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 14:
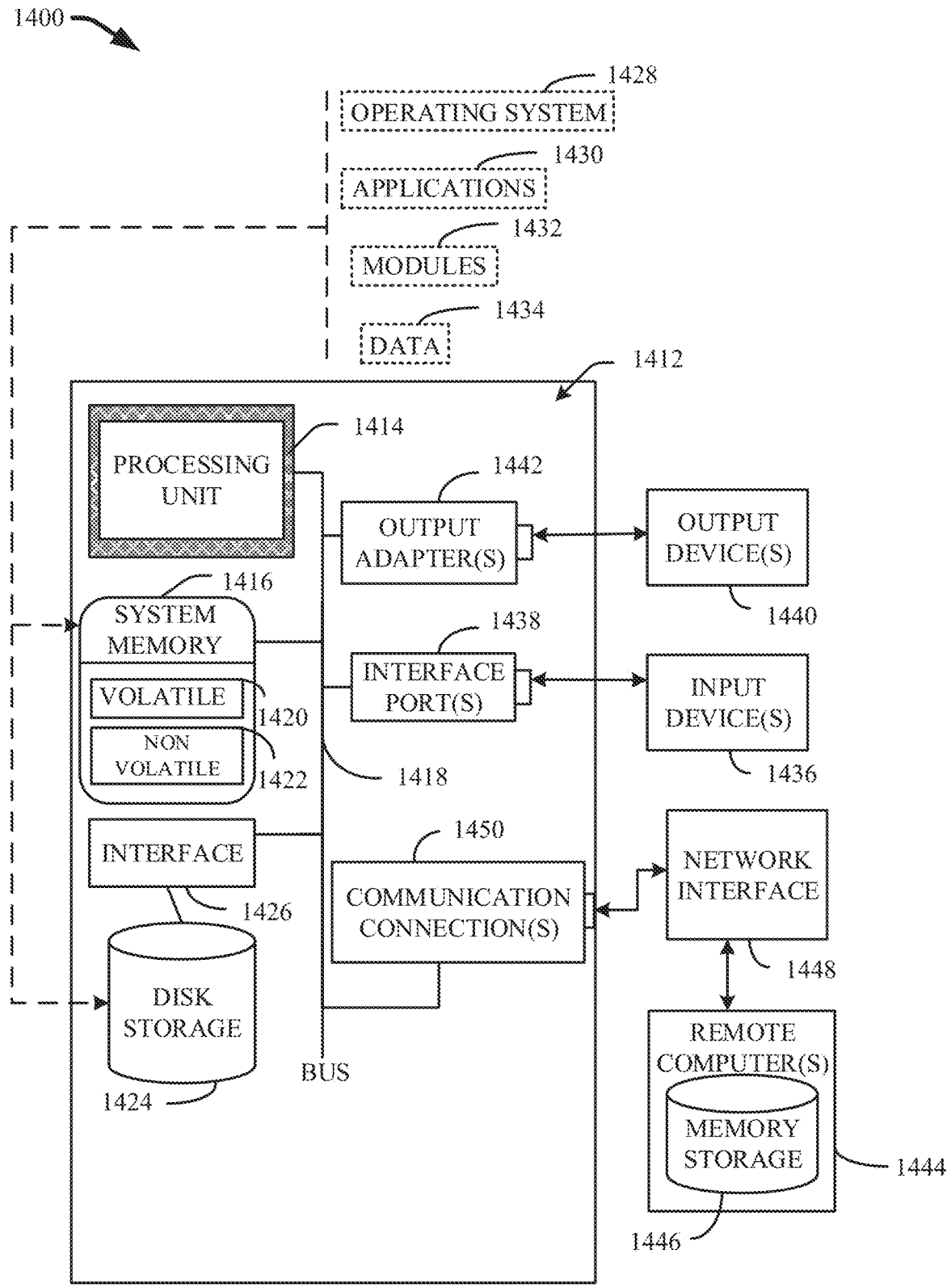
FIG. 14 illustrates a block diagram of an example, non-limiting operating environment in which one or more embodiments described herein can be facilitated.

In order to provide a context for the various aspects of the disclosed subject matter, FIG. 14 as well as the following discussion are intended to provide a general description of a suitable environment in which the various aspects of the disclosed subject matter can be implemented. FIG. 14 illustrates a block diagram of an example, non-limiting operating environment in which one or more embodiments described herein can be facilitated. Repetitive description of like elements employed in other embodiments described herein is omitted for sake of brevity.

With reference to FIG. 14, a suitable operating environment 1400 for implementing various aspects of this disclosure can also include a computer 1412. The computer 1412 can also include a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414. The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1416 can also include volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1420 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1412 can also include removable/non-removable, volatile/nonvolatile computer storage media. FIG. 14 illustrates, for example, a disk storage 1424. Disk storage 1424 can also include, but is not limited to, devices like a magnetic disk drive, floppy disk drive, tape drive, Jaz drive, Zip drive, LS-100 drive, flash memory card, or memory stick. The disk storage 1424 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface is typically used, such as interface 1426. FIG. 14 also depicts software that acts as an intermediary between users and the basic computer resources described in the suitable operating environment 1400. Such software can also include, for example, an operating system 1428. Operating system 1428, which can be stored on disk storage 1424, acts to control and allocate resources of the computer 1412. System applications 1430 take advantage of the management of resources by operating system 1428 through program modules 1432 and program data 1434, e.g., stored either in system memory 1416 or on disk storage 1424. It is to be appreciated that this disclosure can be implemented with various operating systems or combinations of operating systems. A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port can be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a computer, a server, a router, a network PC, a workstation, a microprocessor based appliance, a peer device or other common network node and the like, and typically can also include many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1450 refers to the hardware/software employed to connect the network interface 1448 to the system bus 1418. While communication connection 1450 is shown for illustrative clarity inside computer 1412, it can also be external to computer 1412. The hardware/software for connection to the network interface 1448 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A hospitality light bulb configured for installation in a light fixture, the hospitality light bulb comprising:
   one or more instruments;
   one or more sensors;
   a memory that stores computer executable components; and
   a processor that executes the computer executable components stored in the memory, wherein the computer executable components comprise:
      a configuration component that:
         employs at least one sensor of the one or more sensors to determine characteristics of a guest in an environment in which the hospitality light bulb is installed,
         determine a hospitality objective of the installation of the hospitality light bulb based on the characteristics of the guest in the environment, and
         perform a self-configuration of at least one parameter of the hospitality light bulb to achieve the hospitality objective;
      an operation component that:
         in response to a determination of a characteristic of the characteristics of the guest in the environment meeting a criterion, execute, by the hospitality light bulb using at least one instrument of the one or more instruments, one or more actions to achieve the hospitality objective of the installation of the hospitality light bulb.

2. The hospitality light bulb of claim 1, wherein the one or more actions comprise an automatic check-in operation of the guest.

3. The hospitality light bulb of claim 2, wherein the one or more actions further comprise provide an indication of a direction in which the guest should travel to get to a guest room assigned to the guest.

4. The hospitality light bulb of claim 2, wherein the one or more actions further comprise coordinate with at least one other hospitality light bulb in the environment to provide an indication of directions in which the guest should travel to get to a guest room assigned to the guest.

5. The hospitality light bulb of claim 1, wherein the one or more actions comprise a concierge operation required by the guest.

6. The hospitality light bulb of claim 5, wherein the concierge operation is one of a dining reservation, an activity reservation, directions to a destination, or a transportation arrangement.

7. The hospitality light bulb of claim 1, wherein the one or more actions comprise a housekeeping operation for a guest room assigned to the guest.

8. A hospitality light comprising:
a hospitality light fixture;
a hospitality light bulb configured for installation in the hospitality light fixture;
one or more instruments located in at least one of the hospitality light bulb or the hospitality light fixture;
one or more sensors located in at least one of the hospitality light bulb or the hospitality light fixture;
a memory that stores computer executable components; and
a processor that executes the computer executable components stored in the memory, wherein the computer executable components comprise:
a configuration component that:
employs at least one sensor of the one or more sensors to determine characteristics of a guest in an environment in which the hospitality light bulb is installed,
determine a hospitality objective of the installation of the hospitality light bulb based on the characteristics of the guest in the environment, and
perform a self-configuration of at least one parameter of the hospitality light bulb to achieve the hospitality objective;
an operation component that:
in response to a determination of a characteristic of the characteristics of the guest in the environment meeting a criterion, execute, by the hospitality light bulb using at least one instrument of the one or more instruments, one or more actions to achieve the hospitality objective of the installation of the hospitality light bulb.

9. The hospitality light of claim 8, wherein the one or more actions comprise an automatic check-in operation of the guest.

10. The hospitality light of claim 9, wherein the one or more actions further comprise provide an indication of a direction in which the guest should travel to get to a guest room assigned to the guest.

11. The hospitality light of claim 9, wherein the one or more actions further comprise coordinate with at least one other hospitality light bulb in the environment to provide an indication of directions in which the guest should travel to get to a guest room assigned to the guest.

12. The hospitality light of claim 8, wherein the one or more actions comprise a concierge operation required by the guest.

13. The hospitality light of claim 12, wherein the concierge operation is one of a dining reservation, an activity reservation, directions to a destination, or a transportation arrangement.

14. The hospitality light of claim 8, wherein the one or more actions comprise a housekeeping operation for a guest room assigned to the guest.

15. A method comprising:
determining, by a hospitality light bulb via one or more sensors of the hospitality light bulb, one or more characteristics of a guest in an environment in which the hospitality light bulb is installed;
determine, by the hospitality light bulb, a hospitality objective of the installation of the hospitality light bulb based on the characteristics of the guest in the environment;
performing, by the hospitality light bulb, a self-configuration of at least one parameter of the hospitality light bulb to achieve the hospitality objective;
in response to a determination of a characteristic of the characteristics of the guest in the environment meeting a criterion, execute, by the hospitality light bulb using one or more instruments of the hospitality light bulb, one or more actions to achieve the hospitality objective of the installation of the hospitality light bulb.

16. The method of claim 15, wherein the one or more actions comprise performing, by the hospitality light bulb, an automatic check-in operation of the guest.

17. The method of claim 16, wherein the one or more actions further comprise providing, by the hospitality light bulb, an indication of a direction in which the guest should travel to get to a guest room assigned to the guest.

18. The method of claim 16, wherein the one or more actions further comprise coordinating, by the hospitality light bulb, with at least one other hospitality light bulb in the environment to provide an indication of directions in which the guest should travel to get to a guest room assigned to the guest.

19. The method of claim 15, wherein the one or more actions comprise performing, by the hospitality light bulb, a concierge operation required by the guest.

20. The method of claim 15, wherein the one or more actions comprise performing, by the hospitality light bulb, a housekeeping operation for a guest room assigned to the guest.

* * * * *